United States Patent
Takahashi

(10) Patent No.: US 10,884,676 B2
(45) Date of Patent: Jan. 5, 2021

(54) INFORMATION PROCESSING APPARATUS, SYSTEM, CONTROL METHOD, AND NON-TRANSITORY COMPUTER-READABLE STORAGE MEDIUM STORING PROGRAM, WITH DISPLAYING INSTRUCTION ITEM FOR REFLECTING SETTING INFORMATION OF PAGE ON ANOTHER PAGE WITH SAME ATTRIBUTE

(71) Applicant: CANON KABUSHIKI KAISHA, Tokyo (JP)

(72) Inventor: Daiki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/453,066

(22) Filed: Jun. 26, 2019

(65) Prior Publication Data

US 2020/0012458 A1 Jan. 9, 2020

(30) Foreign Application Priority Data

Jul. 6, 2018 (JP) .................................. 2018-129464

(51) Int. Cl.
*G06F 3/12* (2006.01)
(52) U.S. Cl.
CPC ............ *G06F 3/1204* (2013.01); *G06F 3/125* (2013.01); *G06F 3/1256* (2013.01)
(58) Field of Classification Search
None
See application file for complete search history.

(56) References Cited

U.S. PATENT DOCUMENTS

| | | | | |
|---|---|---|---|---|
| 7,061,632 | B1 * | 6/2006 | Livingston | B41J 29/38 358/1.13 |
| 2003/0184788 | A1 * | 10/2003 | Watanabe | G06K 15/00 358/1.13 |
| 2004/0181754 | A1 * | 9/2004 | Kremer | G06T 11/60 715/201 |
| 2005/0128516 | A1 * | 6/2005 | Tomita | H04N 1/00355 358/1.15 |
| 2006/0291888 | A1 * | 12/2006 | Miyamoto | H04N 1/00384 399/81 |
| 2009/0265625 | A1 * | 10/2009 | Tamai | H04N 1/00408 715/274 |
| 2012/0268792 | A1 * | 10/2012 | Ozaki | G06F 3/1252 358/1.18 |

FOREIGN PATENT DOCUMENTS

JP 2006-163774 A 6/2006

\* cited by examiner

*Primary Examiner* — Thomas D Lee
(74) *Attorney, Agent, or Firm* — Venable LLP

(57) ABSTRACT

An information processing apparatus comprises: a generation unit configured to generate book data formed from a plurality of pages based on original data; a selection unit configured to select, from the plurality of pages in the book data, a page whose setting information is to be acquired; a display control unit configured to display an instruction item for reflecting the setting information of the page selected by the selection unit on another page with the same attribute as an attribute of the selected page; and a reflection unit configured to reflect, if the instruction item is selected, the setting information of the selected page on the other page with the same attribute as the attribute of the selected page, wherein display contents corresponding to the instruction item are decided based on the attribute of the selected page.

18 Claims, 30 Drawing Sheets

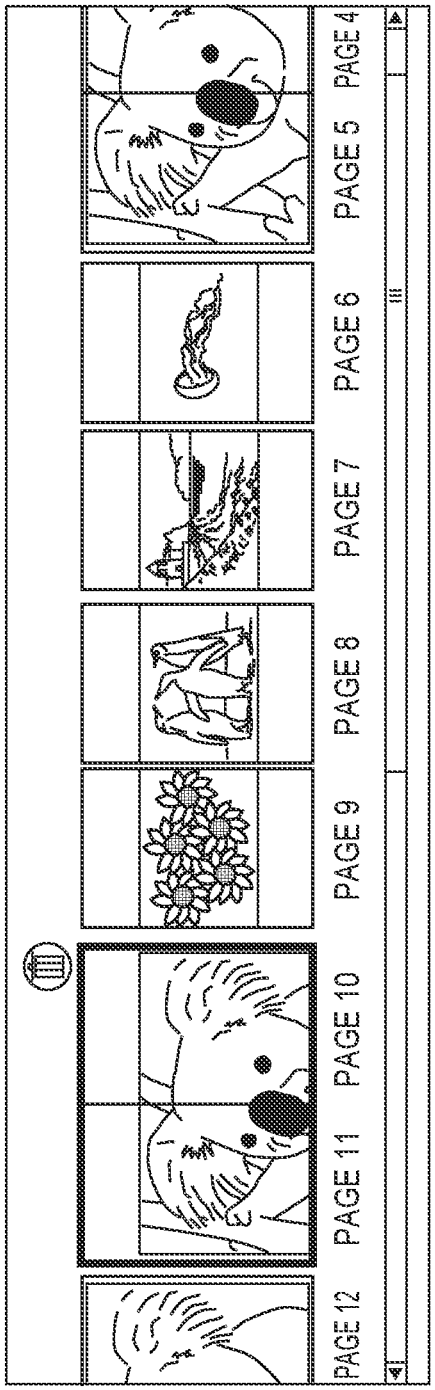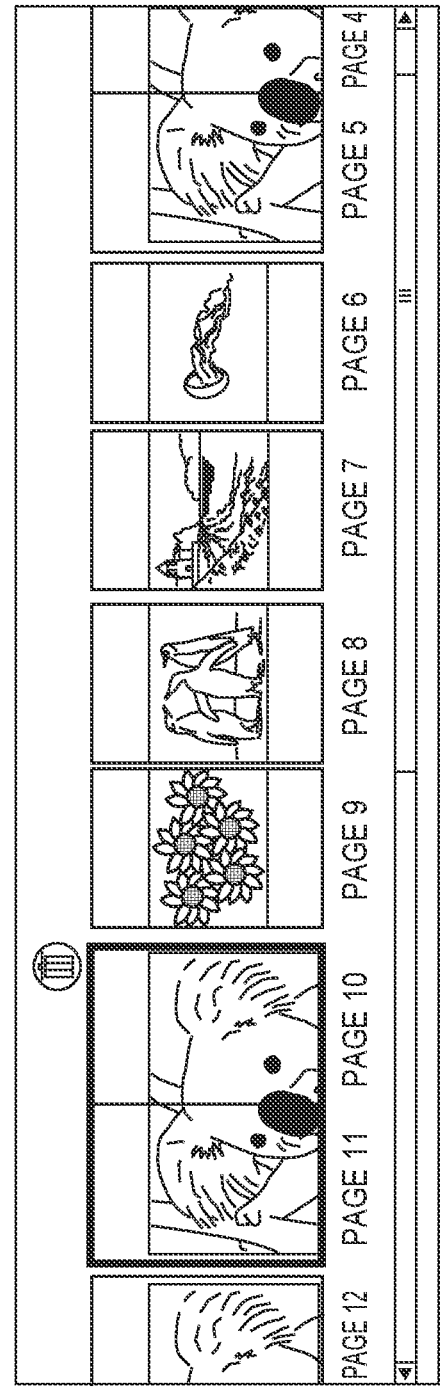

| FORM OF COVER | FOCUSED PAGE | | | | | |
|---|---|---|---|---|---|---|
| | TEXT | | | | COVER | |
| | RIGHT | LEFT | SPREAD | | SPREAD | NO SPREAD |
| | | | DOUBLE-PAGE SPREAD OF TEXT | DOUBLE-PAGE SPREAD OF COVER | DOUBLE-PAGE SPREAD OF TEXT | FRONT COVER | BACK COVER |
| SPREAD | RIGHT TEXT | LEFT TEXT | DOUBLE-PAGE SPREAD OF TEXT | BUTTON INVALID | DOUBLE-PAGE SPREAD OF TEXT | — | — |
| NO SPREAD | RIGHT TEXT | LEFT TEXT | — | — | — | BUTTON INVALID | BUTTON INVALID |

| FORM OF COVER | FOCUSED PAGE | | | | |
|---|---|---|---|---|---|
| | TEXT | | COVER | | |
| | RIGHT | LEFT | SPREAD | NO SPREAD | |
| | | | | FRONT COVER (LEFT SIDE) | BACK COVER |
| SPREAD | RIGHT TEXT | LEFT TEXT | DOUBLE-PAGE SPREAD OF COVER | | |
| NO SPREAD | RIGHT TEXT & BACK COVER | LEFT TEXT & FRONT COVER | DOUBLE-PAGE SPREAD OF TEXT & DOUBLE-PAGE SPREAD OF COVER | RIGHT TEXT & FRONT COVER | LEFT TEXT & BACK COVER |
| | | | DOUBLE-PAGE SPREAD OF TEXT | — | — |

FIG. 28C

| FORM OF COVER | FOCUSED PAGE | | | | | |
|---|---|---|---|---|---|---|
| | TEXT | | | | COVER | |
| | RIGHT | LEFT | SPREAD | | SPREAD | NO SPREAD |
| | RIGHT TEXT | LEFT TEXT | DOUBLE-PAGE SPREAD OF TEXT & DOUBLE-PAGE SPREAD OF COVER | DOUBLE-PAGE SPREAD OF TEXT | DOUBLE-PAGE SPREAD OF COVER | FRONT COVER | BACK COVER (LEFT SIDE) |
| SPREAD | RIGHT TEXT & FRONT COVER | LEFT TEXT & BACK COVER | | | DOUBLE-PAGE SPREAD OF TEXT & DOUBLE-PAGE SPREAD OF COVER | — | — |
| NO SPREAD | | | DOUBLE-PAGE SPREAD OF TEXT | — | RIGHT TEXT & FRONT COVER | LEFT TEXT & BACK COVER |

2821, 2822, 2823, 2824, 2825

INFORMATION PROCESSING APPARATUS, SYSTEM, CONTROL METHOD, AND NON-TRANSITORY COMPUTER-READABLE STORAGE MEDIUM STORING PROGRAM, WITH DISPLAYING INSTRUCTION ITEM FOR REFLECTING SETTING INFORMATION OF PAGE ON ANOTHER PAGE WITH SAME ATTRIBUTE

BACKGROUND OF THE INVENTION

Field of the Invention

The present invention relates to an information processing apparatus capable of creating book data, a system, a control method, and a non-transitory computer-readable storage medium storing a program.

Description of the Related Art

Conventionally, there is known a technique of performing bookbinding such as stapling by allocating image data to pages. Japanese Patent Laid-Open No. 2006-163774 describes that when executing an operation of setting pages, the reflection destination of setting values can be selected from "selected one page", "all pages", "every other page", and "arbitrary plural pages individually designated".

The user's operation load of printing a book is heavy, and thus it is required to reduce the operation load.

SUMMARY OF THE INVENTION

The present invention provides an information processing apparatus for reducing the user's operation load of printing a book, a system, a control method, and a non-transitory computer-readable storage medium storing a program.

The present invention in one aspect provides an information processing apparatus comprising: a generation unit configured to generate book data formed from a plurality of pages based on original data; a selection unit configured to select, from the plurality of pages in the book data, a page whose setting information is to be acquired; a display control unit configured to display an instruction item for reflecting the setting information of the page selected by the selection unit on another page with the same attribute as an attribute of the selected page; and a reflection unit configured to reflect, if the instruction item is selected, the setting information of the selected page on the other page with the same attribute as the attribute of the selected page, wherein display contents corresponding to the instruction item are decided based on the attribute of the selected page.

According to the present invention, it is possible to reduce the user's operation load of printing a book.

Further features of the present invention will become apparent from the following description of exemplary embodiments with reference to the attached drawings.

BRIEF DESCRIPTION OF THE DRAWINGS

FIGS. 18A and 18B are views for explaining a change of display before and after application of collective reflection;

FIG. 27 is a view showing a state after application of collective change of the settings of the double-page spread; and FIGS. 28A to 28C show tables each showing a list of application destinations of collective reflection.

DESCRIPTION OF THE EMBODIMENTS

Figure 1:
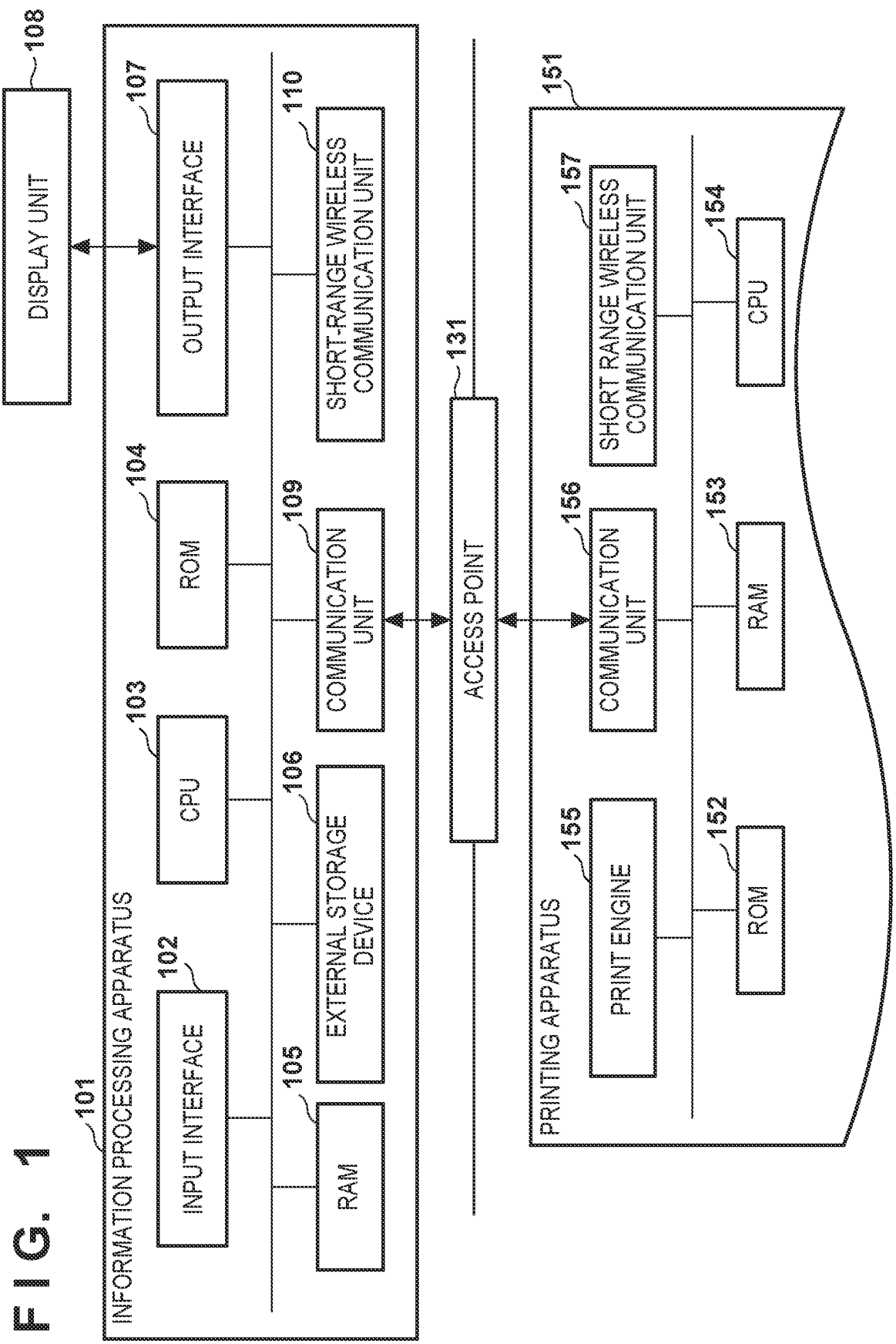
FIG. 1 is a block diagram showing an example of a system arrangement and examples of the hardware arrangements of apparatuses.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements and a description thereof will be omitted.

System and Apparatus Arrangements

An example of a system arrangement according to this embodiment will be described with reference to FIG. 1. This system includes an information processing apparatus 101 and a printing apparatus 151, and executes print processing by transmitting print data prepared by the information processing apparatus 101 to the printing apparatus 151 via a network. Note that communication between the information processing apparatus 101 and the printing apparatus 151 can be performed via an access point 131 by, for example, a wireless LAN complying with the IEEE802.11 standard series. Note that although an embodiment based on a network arrangement using the access point 131 will be described below, another arrangement in which the information processing apparatus 101 and the printing apparatus 151 are communicable with each other may be used. For example, the information processing apparatus 101 and the printing apparatus 151 may be connected via a wired line (not shown). Furthermore, an apparatus having both the function of the information processing apparatus 101 and the function of the printing apparatus 151 may be used. In this case, information can be exchanged between the information processing apparatus 101 and the printing apparatus 151 via buses in the apparatuses and the like. A plurality of blocks shown in FIG. 1 may be integrated into one block and one block may be divided into a plurality of blocks. In addition, a block other than those shown in FIG. 1 may be added, and one or more of the blocks shown in FIG. 1 may be omitted.

The information processing apparatus 101 is an arithmetic apparatus capable of converting print target data into print data, such as a personal computer (PC), a smartphone, a mobile terminal, a notebook PC, a tablet terminal, or a PDA (Personal Digital Assistant). The printing apparatus 151 is an arbitrary printer capable of executing print processing by acquiring print data from an external apparatus such as the information processing apparatus 101. Assume that the printing apparatus 151 executes printing by the inkjet method in this embodiment. However, for example, the printing apparatus 151 may execute printing by another arbitrary method such as an electrophotographic method. The printing apparatus 151 may be a Multi Function Peripheral having a plurality of functions such as a copy function, a FAX function, and a print function.

The information processing apparatus 101 includes, for example, an input interface 102, a CPU 103, a ROM 104, a RAM 105, an external storage device 106, an output interface 107, a communication unit 109, and a short-range wireless communication unit 110. CPU, ROM, and RAM are acronyms for "Central Processing Unit", "Read Only Memory", and "Random Access Memory", respectively. Note that although FIG. 1 shows an example a case in which the information processing apparatus 101 displays information on a display device (display unit 108) such as an external display, the information processing apparatus 101 may include the display unit 108.

The input interface 102 is an interface for accepting a data input and an operation instruction from a user. The input interface 102 is formed by, for example, a physical keyboard, buttons, a touch panel, or the like. Note that the output interface 107 (to be described later) and the input interface 102 may be integrated so that output of a screen and acceptance of an operation from the user are performed using common hardware.

The CPU 103 serves as a system control unit, and controls the overall information processing apparatus 101. The ROM 104 stores permanent data such as control programs to be executed by the CPU 103, data tables, and an embedded operating system (to be referred to as an "OS" hereinafter) program. In this embodiment, the control programs stored in the ROM 104 perform software execution control such as scheduling, task switching, and interrupt processing under the management of the embedded OS stored in the ROM 104. The RAM 105 is implemented by an SRAM (Static Random Access Memory) or the like that needs a backup power supply. Note that the RAM 105 holds data by a primary battery (not shown) for data backup, and can thus store important data such as program control variables without volatilizing them. The RAM 105 can be provided with a memory area to store setting information and management data of the information processing apparatus 101, and the like. The RAM 105 can also be used as the main memory and work memory of the CPU 103.

The external storage device 106 saves an application for providing a print execution function, a print information generation program for generating print information interpretable by the printing apparatus 151, and the like. The external storage device 106 can also save various programs such as a control program for transmitting/receiving information to/from another apparatus (for example, the printing apparatus 151) connected via the communication unit 109, and various kinds of information to be used by these programs.

The output interface 107 is an interface used by the display unit 108 to perform control for displaying data and presenting information of the state of the information processing apparatus 101. The output interface 107 outputs control information and display target information for causing the display unit 108 to display the information. The display unit 108 includes an LED (Light Emitting Diode) and LCD (Liquid Crystal Display), and displays data and notifies the user of the state of the information processing apparatus 101. Note that a software keyboard including keys such as numerical value input keys, a mode setting key, an enter key, a cancel key, and a power key may be displayed on the display unit 108, and an input from the user may be accepted via the software keyboard.

The communication unit 109 includes a radio frequency (RF) circuit and a baseband circuit for executing data communication by performing connection to an external apparatus such as the printing apparatus 151. For example, the communication unit 109 can communicate with the printing apparatus 151 via the access point 131 existing separately from the information processing apparatus 101 and the printing apparatus 151. The access point 131 can be, for example, a device such as a wireless LAN router that operates in accordance with a wireless communication method complying with the IEEE802.11 standard series. Furthermore, the communication unit 109 may establish direct connection to the printing apparatus 151 in accordance with a protocol such as Wi-Fi (Wireless Fidelity) Direct®. If the printing apparatus 151 includes an access point (not shown), the communication unit 109 may be connected to the access point to establish direct connection to the printing apparatus 151. Note that the communication unit 109 can be configured to perform communication by WiFi® but may perform communication by another wireless communication method such as Bluetooth®.

The short-range wireless communication unit 110 executes data communication by establishing wireless connection to the short-range wireless communication unit 157 of the printing apparatus 151 based on at least the fact that the printing apparatus 151 (external apparatus) enters a predetermined short-range area. The short-range wireless communication unit 110 performs communication by a communication method different from that of the communication unit 109, such as Bluetooth Low Energy (BLE).

The printing apparatus 151 includes, for example, a ROM 152, a RAM 153, a CPU 154, a print engine 155, a communication unit 156, and a short-range wireless communication unit 157.

The communication unit 156 includes a radio frequency (RF) circuit and a baseband circuit for performing connection to an external apparatus such as the information processing apparatus 101. The communication unit 156 corresponds to the communication unit 109 of the information processing apparatus 101, and performs communication by a wireless communication method such as Wi-Fi or Bluetooth. The communication unit 156 may be directly connected to the communication unit 109 of the information processing apparatus 101 by functioning as an access point or in accordance with a predetermined protocol, as described above, or may be connected to the communication unit 109 via the external access point 131 or the like. If the communication unit 156 functions as an access point, the communication unit 156 may have hardware for functioning as an access point, or may use software that allows the communication unit 156 to function as an access point. Note that although the information processing apparatus 101 and the printing apparatus 151 are connected to the one access point 131 in the example of FIG. 1, they may be connected to different access points connected to the network, and may be connected to each other via the network.

The short-range wireless communication unit 157 executes data communication by establishing wireless connection to the short-range wireless communication unit 110 of the information processing apparatus 101 based on at least the fact that the information processing apparatus 101 (external apparatus) enters a predetermined short-range area. The short-range wireless communication unit 157 corresponds to the short-range wireless communication unit 110 of the information processing apparatus 101, and performs communication by a wireless communication method such as BLE. Note that, for example, print information transmitted from the information processing apparatus 101 or the like has a large amount of data, requires high-speed large-capacity communication, and is thus received via the communication unit 156 capable of performing communication at a speed higher than that of the short-range wireless communication unit 157.

The RAM 153 is a memory similar to the RAM 105. The RAM 153 is provided with a memory area to store setting information and management data of the printing apparatus 151, and the like. The RAM 153 is also used as the main memory and work memory of the CPU 154, functions as a reception buffer for temporarily saving print information received from the information processing apparatus 101 or the like, and also saves various kinds of information. The ROM 152 stores permanent data such as control programs to be executed by the CPU 154, data tables, and an OS program. When the CPU 154 executes the control programs stored in the ROM 152, software execution control such as scheduling, task switching, and interrupt processing can be executed under the management of the embedded OS stored in the ROM 152. The CPU 154 serves as a system control unit, and controls the overall printing apparatus 151. Note that a memory such as an external HDD or SD card may be mounted as an optional device on the printing apparatus 151, and the information saved in the printing apparatus 151 may be saved in such memory.

The print engine 155 forms an image on a print medium such as a sheet using a recording material such as ink based on the information saved in the RAM 153 and the print information received from the information processing apparatus 101 or the like, and outputs a print result.

Figure 2:
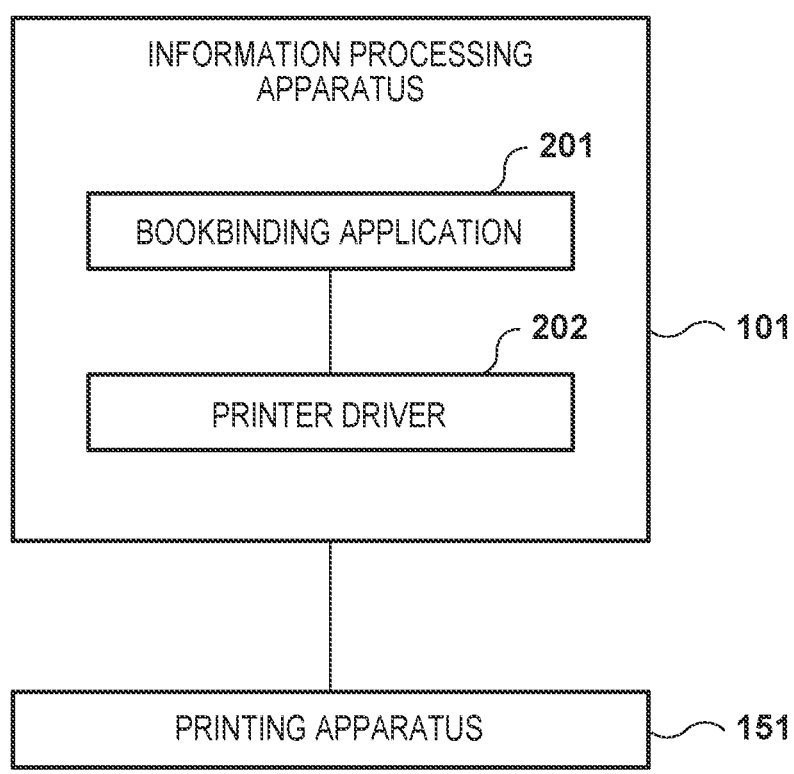
FIG. 2 is a block diagram showing an example of the software arrangement of the information processing apparatus.
Figure 4:
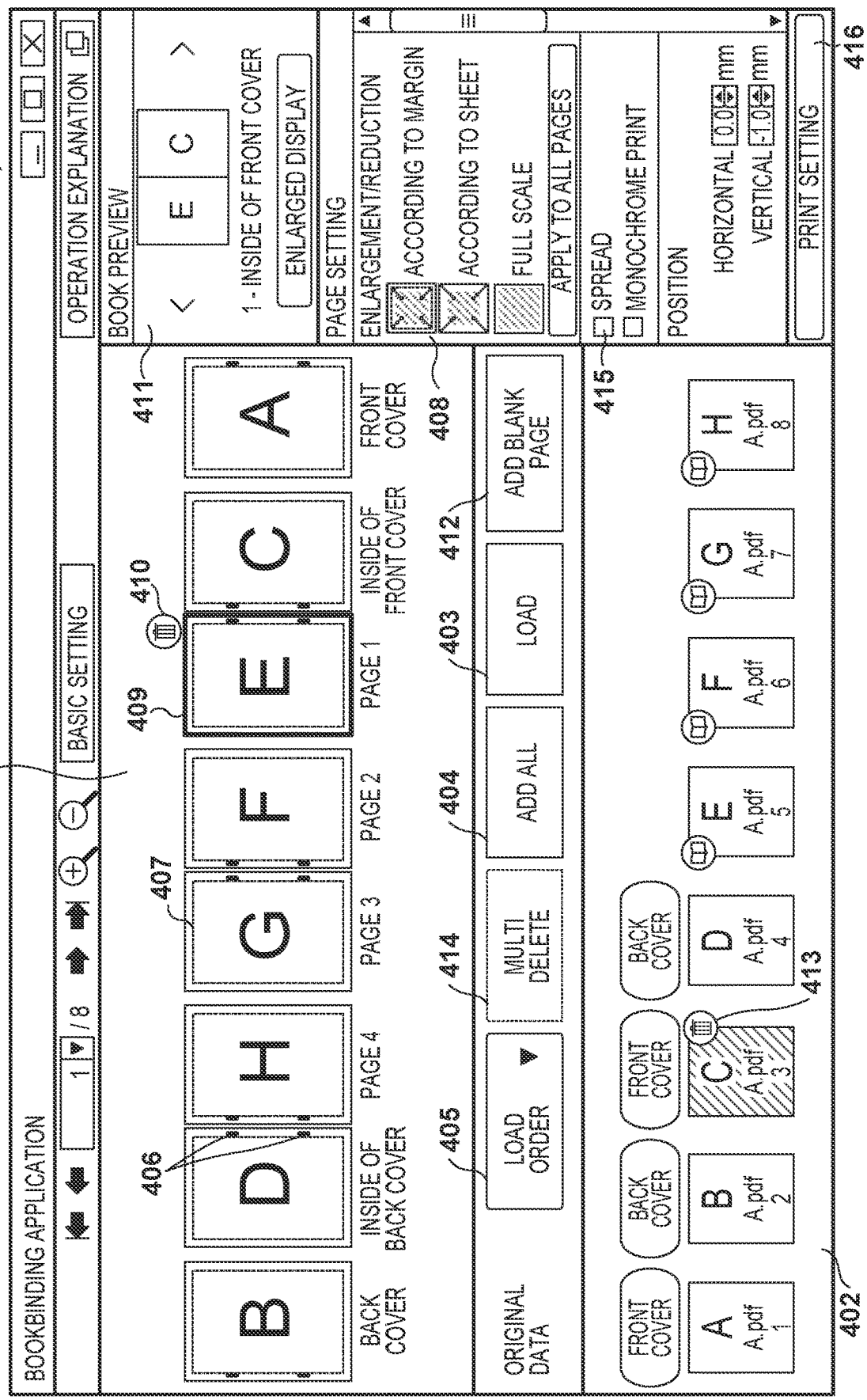
FIG. 4 is a view showing an example of an edit screen in the bookbinding application.

FIG. 2 is a block diagram showing an example of the functional arrangement of the information processing apparatus 101. The information processing apparatus 101 includes, for example, as functional components, a bookbinding application 201 that executes processing (to be described later), and a printer driver 202 that generates print data interpretable by the printing apparatus 151. When the user inputs a print instruction to the screen of the bookbinding application 201 (to be described later), the printer driver 202 receives application data output from the bookbinding application 201, and generates print data. Note that a print instruction in the screen of the bookbinding application 201 corresponds to, for example, the pressing of an OK button included in a screen displayed after a print setting button 416 shown in FIG. 4 is pressed. The user can designate a print area (page number, sheet number, or the like) using the screen displayed after the print setting button 416 shown in FIG. 4 is pressed. Then, when the printer driver 202 transmits the print data generated by the bookbinding application 201 to the printing apparatus 151, the printing apparatus 151 executes print processing.

Overview of Operation of Bookbinding Application

Figure 3:
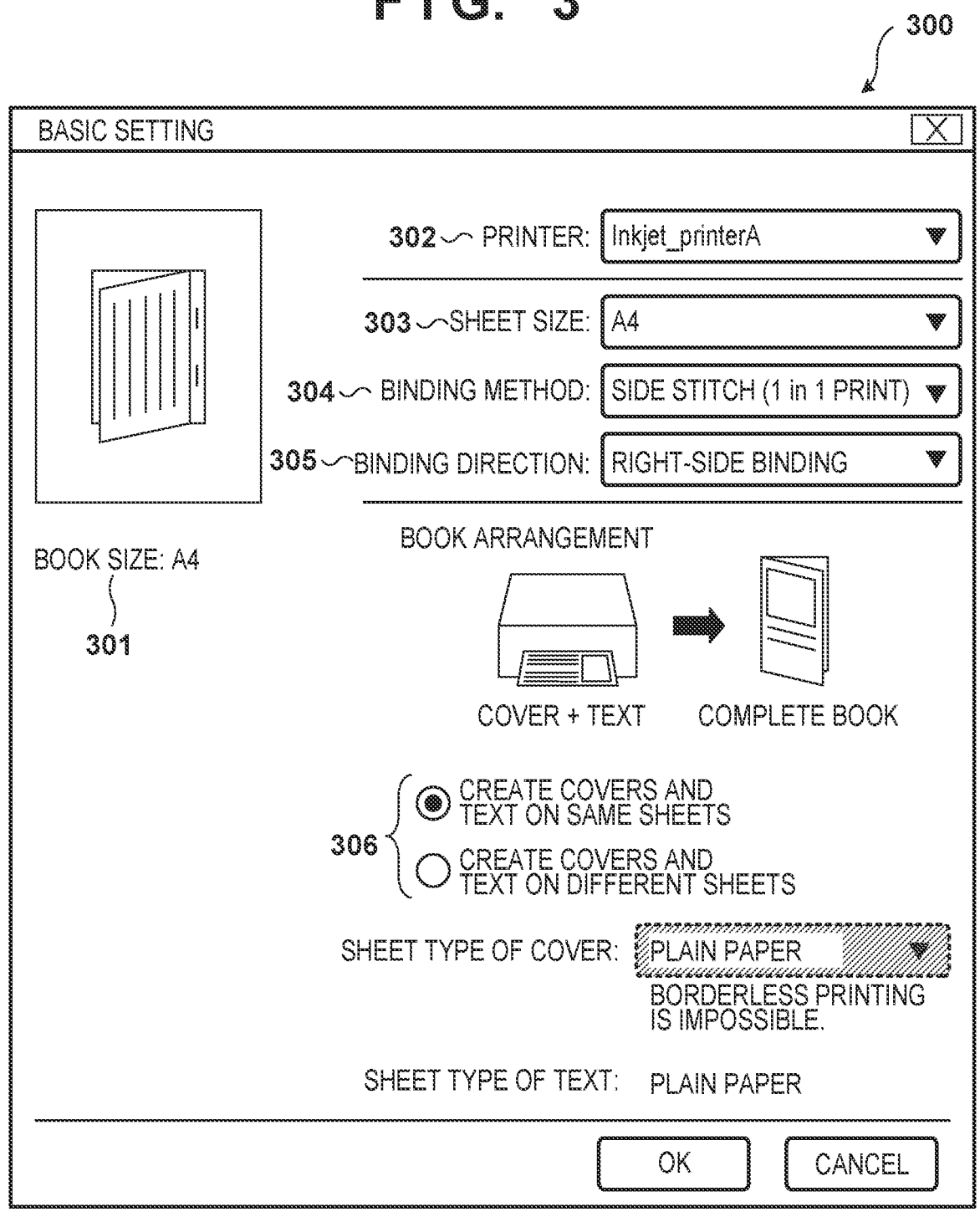
FIG. 3 is a view showing an example of the basic setting screen of a bookbinding application.

Subsequently, an example of the procedure of the bookbinding operation by the above-described bookbinding application 201 will be described. FIG. 3 shows an example of a basic setting screen displayed on the display unit 108 when the CPU 103 of the information processing apparatus 101 executes, for example, programs corresponding to the bookbinding application 201 stored in the ROM 104 and the external storage device 106. As an example, a basic setting screen 300 includes a post-bookbinding image 301, a printer selection region 302, a sheet size selection region 303, a binding method setting region 304, a binding direction setting region 305, and a cover sheet-related setting region 306.

The printer selection region 302 is a region where a printing apparatus to be used is selected. When a pull-down button in the printer selection region 302 is pressed by a user operation, a list of printing apparatuses usable by the information processing apparatus 101 is displayed. The user can select, from the list, a printing apparatus to be used to create book data (to be also referred to as a book hereinafter) by the bookbinding application 201. Note that with respect to the list of the printing apparatuses displayed when the pull-down button in the printer selection region 302 is pressed, only printing apparatuses supportable by the bookbinding application 201 can be displayed. However, the present invention is not limited to this. For example, all the printing apparatuses usable by the information processing apparatus 101 may be displayed regardless of whether they can be supported by the bookbinding application 201.

The sheet size selection region 303 is a region where a sheet size to be used for bookbinding is selected. When a pull-down button in the sheet size selection region 303 is pressed by a user operation, a list of sheet sizes usable by the printing apparatus selected in the printer selection region 302 is displayed. The user can select, from the displayed list of the sheet sizes, one size corresponding to the size of a book to be created. Note that information of the sheet sizes usable by the printing apparatus selected in the printer selection region 302 can be acquired from the printing apparatus via, for example, the printer driver 202.

The binding method setting region 304 is a region where a binding method of a book is set. When a pull-down button in the binding method setting region 304 is pressed by a user operation, for example, "side stitch" and "saddle stitch" are selectably displayed. "Side stitch" is a binding method of performing bookbinding of the side of a plurality of printed sheets overlapping each other on the binding side using a staple or the like. "Saddle stitch" is a binding method of doubling a plurality of printed sheets overlapping each other, and performing bookbinding at a folding portion of the doubled sheets using a staple or the like. If "saddle stitch" is selected, it is assumed that the sheets are doubled, and thus a 2-in-1 print setting can be selected automatically. Note that if "saddle stitch" is selected, for example, settings such as 4-in-1 other than 1-in-1 may be selectably displayed. Furthermore, "saddle stitch" is a binding method of generating a book by overlaying a plurality of printed sheets and then doubling them. Note that if "side stitch" is selected, a 1-in-1 print setting can be selected automatically. In this case as well, however, settings such as 2-in-1 and 4-in-1 may be selectably displayed. Note that if 2-in-1 is not selected for "saddle stitch" or if 1-in-1 is not selected for "side stitch", page allocation (to be described later) is different accordingly.

The binding direction setting region 305 is a region where a binding direction of a book is set. When a pull-down button in the binding direction setting region 305 is pressed by a user operation, for example, "right-side binding" and "left-side binding" are selectably displayed. In some cases, "upper binding" may be selectably displayed. "Right-side binding" indicates a binding direction that binds the right side of the front cover, and "left-side binding" indicates a binding direction that binds the left side of the front cover. In addition, "upper binding" indicates a binding direction that binds the upper portion of the cover. A string "binding direction" in the binding direction setting region 305 may be replaced by "open direction" or the like. Right-open corresponds to right-side binding and left-open corresponds to left-side binding. The setting in this region determines whether the pages of a book to be created advance from right to left or from left to right.

The cover sheet-related setting region 306 is a region where a cover sheet is set. For example, radio buttons that allow the user to select one of an item for creating covers and text by the same type of sheets and an item for creating covers and text by different types of sheets are displayed. Note that if, in the setting region 306, the covers and text are created by the same type of sheets, the sheet type (for example, "plain paper" or the like) of the text is set as the sheet type of the covers, and thus the region that allows selection of the sheet type of the covers is grayed out so as not to be selected. On the other hand, if the setting of creating covers and text by different types of sheets is selected in the setting region 306, the region that allows selection of the sheet type of the covers is activated. Then, when a pull-down button in the region where the sheet type of the covers is set is pressed, a list of selectable sheet types (for example, glossy paper, plain paper, and the like) is displayed. Note that, for example, if "plain paper" is selected, a character string "borderless printing is impossible" can be displayed, and if "glossy paper" is selected, a character string "borderless printing is possible" can be displayed. In addition, necessary information may be set for each sheet type, and a character string corresponding to the sheet type selected by a user operation may be displayed. Furthermore, if the setting of creating covers and text by different types of sheets is selected, a message such as "it is necessary to print by setting different sheets for cover/text" may be displayed.

When "OK" is pressed in the basic setting screen shown in FIG. 3, the screen transitions to an edit screen. The edit screen may be different in accordance with the setting items such as the binding method and the setting of whether the sheet type of the covers is set to be the same as that of the text. Examples of the edit screen corresponding to the basic settings will be described below.

Case in Which Side Stitch is Selected and Covers and Text are Created by Same Type of Sheets FIG. 4 shows an example of the edit screen when the binding method is side stitch (1-in-1), right-side binding is selected, and the setting of using the same type of sheets for the covers and text is made. Note that the example of FIG. 4 shows an example of a state in which a document (original data) for eight pages (from a page where "A" is written to a page where "H" is written) has already been loaded. In a stage before the document is loaded, an edit region 401 and an original data region 402 are in a predetermined state (for example, a blank state) in which the user can recognize that no document has been loaded. Note that in, for example, the stage before the document is loaded, a message such as "please load original data to be put in a book" may be displayed in the edit region 401, and a message that notifies the user of a method of loading data may further be displayed. Note that such message may be displayed in the original data region 402. Another method such as display of a dialog may be used to prompt the user to load original data. Note that one original data may be loaded or a plurality of original data may be loaded.

When the user clicks on a "load" button 403, for example, a file selection dialog is displayed, and the user selects, from a displayed file list, a file (original data) to be used to create a book. When a file is selected, page data included in the file are expanded in the original data region 402. Similarly, a result of automatically allocating the page data included in the file based on a page order and the setting contents in the basic setting screen 300 can be displayed in the edit region 401. Automatic page allocation can be performed so that, for example, page data of the first to fourth pages in the file are set as "front cover", "back cover", "back surface (inside) of front cover", and "back surface (inside) of back cover", respectively, and page data of the subsequent pages are set as text. The edit region 401 shown in FIG. 4 shows an example of a case in which automatic page allocation is performed in this way. In the expanded file, the page data of the first page where "A" is written is allocated to the front cover and the page data of the second page where "B" is written is allocated to the back cover. Then, the page data of the third page where "C" is written is allocated to the inside of the front cover and the page data of the fourth page where "D" is written is allocated to the inside of the back cover. That is, the bookbinding application 201 generates book data as a result of allocating the page data included in the original data, and displays a preview image of each page in the edit region 401 of FIG. 4 based on the generated book data. Note that the page data of the first and second pages of the file may be allocated to "front cover" and "inside of front cover", and the data of the last page and the second page from the last in the file may be allocated to "back cover" and "inside of back cover". Note that FIG. 4 and some following examples show an example of a case in which right-side binding is selected, and the front cover is displayed at the rightmost end and the back cover is displayed at the leftmost end. However, if left-side binding is selected, the front cover is displayed at the leftmost end and the back cover is displayed at the rightmost end.

Note that when contents of the file are expanded in the original data region 402, for example, a confirmation message such as "do you want to perform automatic page allocation?" may be displayed to accept user determination of whether to automatically perform page allocation. In this case, if the user approves automatic page allocation, a result of performing automatic page allocation is displayed in the edit region 401; otherwise, the edit region 401 may remain blank. Alternatively, the page data included in the selected file may only be expanded in the original data region 402 without performing automatic page allocation regardless of user determination. Note that even if automatic page allocation is not performed, when the user clicks on an "add all" button 404, automatic page allocation of the page data is performed in the order of the pages included in the file.

Note that when a plurality of files are read out, all page data included in the plurality of files are expanded in the original data region 402. At this time, the order of the page data to be expanded can be decided by a pull-down menu 405. For example, if, as shown in FIG. 4, "load order" is selected, the page data are expanded in the original data region 402 in an order such that page data of a file selected earlier is displayed on the left side. To the contrary, if, for example, "file name order" (not shown) is selected, the page data are expanded in ascending (descending) order of file names. If, for example, a file whose name is "A.pdf" is opened after a file whose name is "B.pdf", when "load order" is selected, page data of "A.pdf" is displayed on the right side of a position at which page data of "B.pdf" is displayed. On the other hand, if "file name order" is selected, even if "B.pdf" is opened first, the page data of "B.pdf" is displayed on the right side of a position at which the page data of "A.pdf" is displayed. Note that the sort order is not limited to the load order or the file name order, and various orders such as the order of the file creation date (update date) and the order of the use frequency in this application can be used.

The page data allocated in order of appearance when the pages of the book after completion are turned over are displayed in the edit region 401. Note that the page data are included in the above-described book data. That is, the book data includes page data corresponding to a plurality of pages forming the book. Furthermore, display is performed so that the distance between two pages displayed in a spread is shorter than the distance to another page that is adjacent but is not displayed in a spread. This allows the user to readily determine a page forming a spread of the book and a page forming no spread. In the example of FIG. 4, when the distance between the page where "C" is written and the page where "E" is written is sufficiently short, the user can readily recognize that these pages are pages forming a spread. On the other hand, the distance between the page where "E" is written and the page where "F" is written is longer than that between the page where "C" is written and the page where "E" is written. This allows the user to readily recognize that these pages are adjacent to each other but are not pages forming a spread. In this way, the images of all the pages are displayed in the edit region 401 based on the page data of the pages included in the book data. Note that the example of FIG. 4 shows an example of a case in which all the pages included in the book data can be displayed as a whole. However, if the number of pages increases while maintaining the state in which all pages are displayed, the size of each page may become small. To cope with this, the bookbinding application 201 can be configured to perform enlargement/reduction display of each page. At this time, if all the pages cannot be displayed in the edit region 401, a display area can be moved by, for example, displaying a scroll bar in the lower portion of the edit region 401.

Note that if side stitch is selected, binding positions 406 by a staple are also displayed. The binding positions 406 can be displayed by, for example, a predetermined color (for example, red) so that the user can recognize them. The display of the binding positions 406 can be printed intact, and the user can bind the book at the positions using the staple.

In each page displayed in the edit region 401, a boundary 407 indicating the boundary between a printable region and a margin region is displayed. When the user inputs each setting value in a region of page setting 408, the page data is laid out in the page based on the setting values. For example, in the page setting 408, the user sets whether to enlarge/reduce the original data in accordance with the margin or sheet, sets whether to display in a full scale, and sets vertical and horizontal positions. The vertical and horizontal positions are set by moving the position of the original data in the page upward or leftward by a negative value, and moving the position of the original data in the page downward or rightward by a positive value. This allows the user to set in detail how the page data is laid out in the page. Note that these settings can be applied for each page. For example, in the state in which the page where "E" is written is selected in the edit region 401, when the setting values are input in the page setting 408, the setting values are applicable to only the selected page. Note that when "apply to all pages" is selected in the page setting 408, the input settings are collectively applied to all the pages. Note that at this time, the user can recognize the selected page when a page frame 409 of the page where "E" is written is highlighted, thereby recognizing that settings are being made for the specific page. In addition, the user can delete the page from the edit region 401 by pressing, for example, an icon 410.

Figure 5:
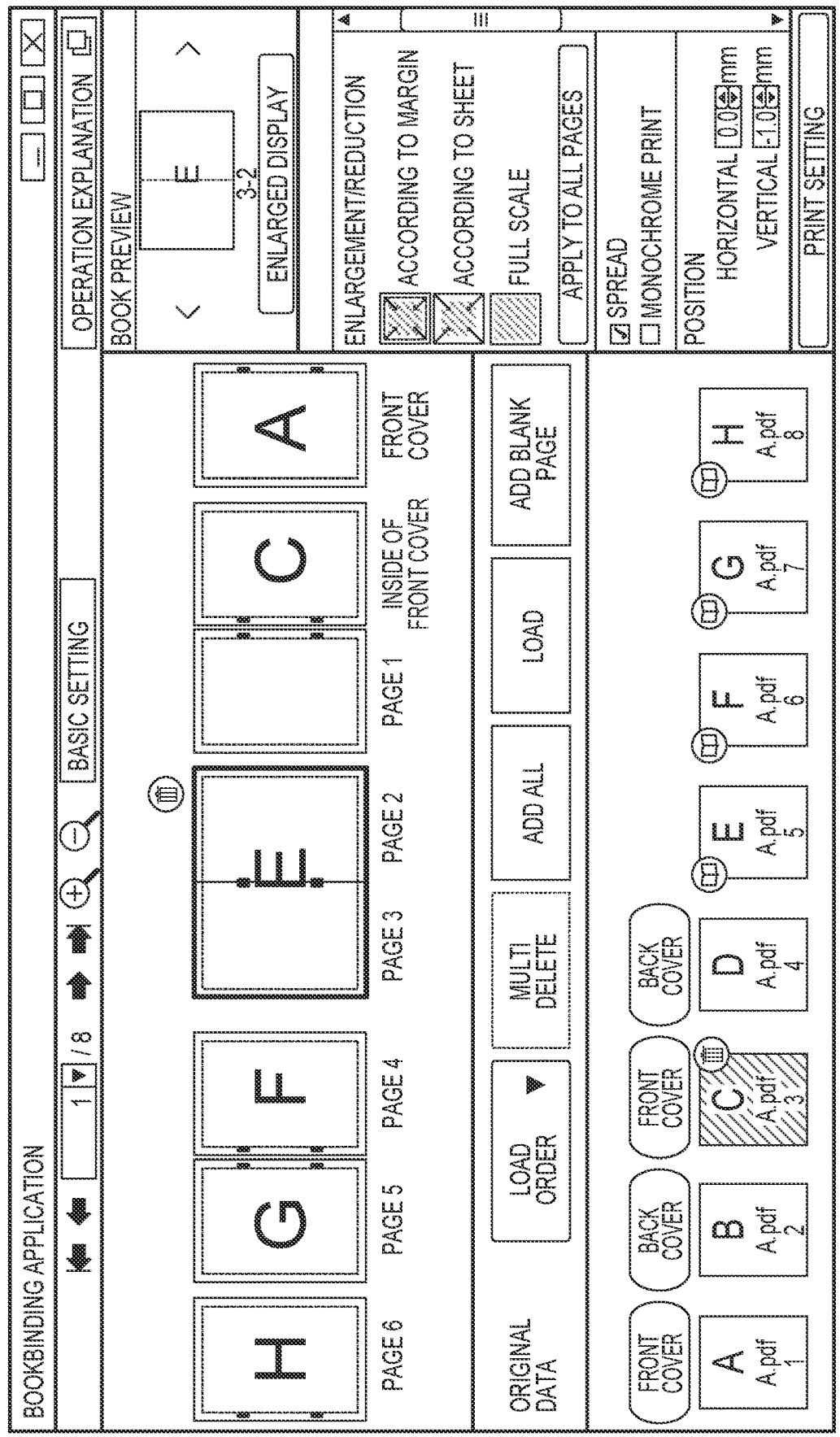
FIG. 5 is a view showing an example of the edit screen in the bookbinding application.

The user can set a spread attribute for one page data by selecting a "spread" checkbox 415. FIG. 5 shows a display example when the "spread" checkbox 415 is selected in the state in which the page where "E" is written is selected, as shown in FIG. 4. When the "spread" checkbox 415 is selected, a spread attribute is imparted to the page data corresponding to the selected page. Then, the page data to which the spread attribute is imparted is allocated to a region of two pages in the edit region. Although different from FIGS. 4 and 5, a case in which the "spread" checkbox 415 is selected in a state in which an even-numbered page of the text (a right page of a spread for right-side binding or a left page of a spread for left-side binding) is selected will be described. In this case, page data allocated to the selected page is displayed at the center of the spread including the selected page. Then, the page data are reallocated so that the pages after the selected page are shifted backward by one page. That is, in this case, the bookbinding application 201 generates a new spread region by adding one page after the selected page, and lays out the page data of the selected page at the center of the new spread region.

On the other hand, if an odd-numbered page of the text, like the page where "E" is written in FIG. 4, is selected, the next page of the selected page is included in a spread different from a spread including the selected page. Note that the odd-numbered page indicates the left page of the spread for right-side binding or the right page of the spread for left-side binding. Therefore, if only one page is added after the selected page to generate a new spread region, and one page data is allocated to the new spread region, the bookbinding application 201 cannot display the page data as a spread. Therefore, if, for example, the "spread" checkbox 415 is selected in the state in which the odd-numbered page of the text is selected, as shown in FIG. 5, one page can be added not only after but also before the selected page. This allows the bookbinding application 201 to allocate the page data of the selected page to one spread region. Note that in this case, the page data are reallocated so that the pages after the selected page are shifted backward by two pages.

When the "spread" checkbox 415 is selected in the state in which the odd-numbered page is selected, a message for notifying the user that one page is added before the selected page may be displayed. If the user approves addition of the page, a spread attribute is set for the selected page data, and the selected page data may be laid out over a plurality of pages. This can prevent addition of a page unintended by the user. Note that if the user does not approve addition of a page, setting of a spread attribute may be canceled. When the "spread" checkbox 415 is selected in the state in which the odd-numbered page is selected, a space for one page may be added after the selected page to allocate the selected page to a region for two pages without displaying the above-described message. Note that when such allocation is performed, the bookbinding application 201 may display a message indicating that the page data of the selected page is not laid out intact in the spread region.

When the "spread" checkbox 415 is cleared after the spread attribute is set for the page data, the spread attribute of the page data is released. As a result, the (preceding and succeeding) pages added at the time of allocation are deleted, and the pages after the pages are reallocated. Note that, for example, a message indicating whether to delete pages such as blank pages added when the odd-numbered page is allocated to the spread may be displayed.

Note that when horizontally long page data is dragged and dropped in the edit region 401 (or allocated automatically), a spread attribute may be set automatically for the page data. In this case, the "spread" checkbox 415 is selected automatically. Furthermore, if the insertion position of the page data is an odd-numbered page, a blank page or the like may be inserted before the page, as described above, or predetermined error display or the like may be performed. When, after the spread attribute is set for the horizontally long page data and the page data is allocated to the spread region, the "spread" checkbox 415 is cleared, the spread attribute of the horizontally long page data is released. As a result, the horizontally long page data can be allocated to one-side page forming the spread (for example, by reduction or rotation). Note that the horizontally long page data may be allocated to one-side page, similarly to a vertically long page without automatically setting the spread attribute for the horizontally long page data. Referring back to FIG. 4, with respect to the selected page, an image of the spread including the page after bookbinding is displayed as a book preview 411, and thus the user can readily recognize the state of the selected page after completion of the book. Note that when "<" or ">" in the preview is selected, a preview of an adjacent spread can be displayed. At this time, the selected page may move together, or only the pages of the preview may move without synchronizing the selected page and the preview with each other.

The user can operate the page data expanded in the original data region 402 for each page. For example, the user can select one page data in the original data region 402, and drag and drop it in the edit region 401, thereby adding the page data as one page of the book. FIG. 4 shows a state in which the page where "C" is written is selected from the data expanded in the original data region 402. If the selected page data is dragged and dropped in an arbitrary position of the edit region 401, it is incorporated in the book data as a page corresponding to the dropped position. For example, the page data is dragged and dropped in a predetermined area, in the edit region 401, between the page where "F" is written and the page where "G" is written. This operation causes the bookbinding application 201 to generate book data in which the page data where "C" is written is inserted between the page data of "F" and the page data of "G". Note that if such page data is inserted, the spread relationship is reconstructed based on the book data after insertion. That is, the page of "F" and the newly added page of "C" have the spread relationship, and the page of "G" has the spread relationship with the page of "H" due to addition of the page of "C".

Furthermore, the user can add a blank page by pressing an "add blank page" button 412. For example, if the "add blank page" button 412 is pressed in the state in which the page where "C" is written is selected, a blank page is added between the page where "C" is written and the page where "E" is written. In this case, the bookbinding application 201 generates book data including blank page data between the page data of "C" and "E". A blank page may be added to the right or left side of the selected page in accordance with a predetermined rule or, if two pages are selected, may be added between the two pages. Thus, if the back surfaces of the covers are desirably blank, or in accordance with the user's preferences or the like, a blank page can be added to an arbitrary position in the book.

Note that if the page data in the original data region 402 is used in the edit region 401, information for specifying it is added at the upper left position of each data. Referring to FIG. 4, the page data where "A" is written and the page data where "C" is written are used for the front cover (and its back surface). Then, the page data where "B" is written and the page data where "D" is written are used for the back cover (and its back surface). Then, other page data are used for the text. This allows the user to recognize that, for example, page data to be included as a page in the book is not used in the edit region 401 or page data not to be included in the book is unwantedly used. In addition, the user can recognize whether page data to be used for the cover is appropriate. The user can delete page data not to be used for creation of the book in the original data region 402. For example, the user can select an icon 413 displayed at the upper right position of the data in the selected state to delete the selected page data from the original data region 402. This can prevent an edit operation from becoming cumbersome due to the existence of many data not to be used in the original data region 402.

Furthermore, in the original data region 402, it is possible to select a plurality of data and collectively operate them. For example, in a state in which the page data where "C" is written and the page data where "D" is written are selected, the page data are collectively dragged and dropped in the edit region 401. This operation can insert these page data into the book data as two successive pages. The same applies to a case in which three or more page data are selected.

Furthermore, if a "multi delete" button 414 is pressed in a state in which a plurality of page data are selected, the plurality of page data can collectively be deleted from the original data region 402. Note that if one data is selected or no data is selected, the "multi delete" button 414 can be disabled, for example, grayed out.

Upon completion of editing of the book, as described above, the user can execute printing of the book by pressing a print setting button 416. That is, the bookbinding application 201 outputs application data based on the book data including the page data arranged in an order according to the above edit processing. Then, the printer driver 202 generates print data based on the output application data. Note that for side stitch (1-in-1) where n is an integer of 1 or more, double-sided printing is executed so that the (2n−1)th page and 2nth page have the front-back relationship. Note that double-sided printing is executed so that the front cover and its back surface have the front-back relationship and the back cover and its back surface have the front-back relationship.

Figure 6:
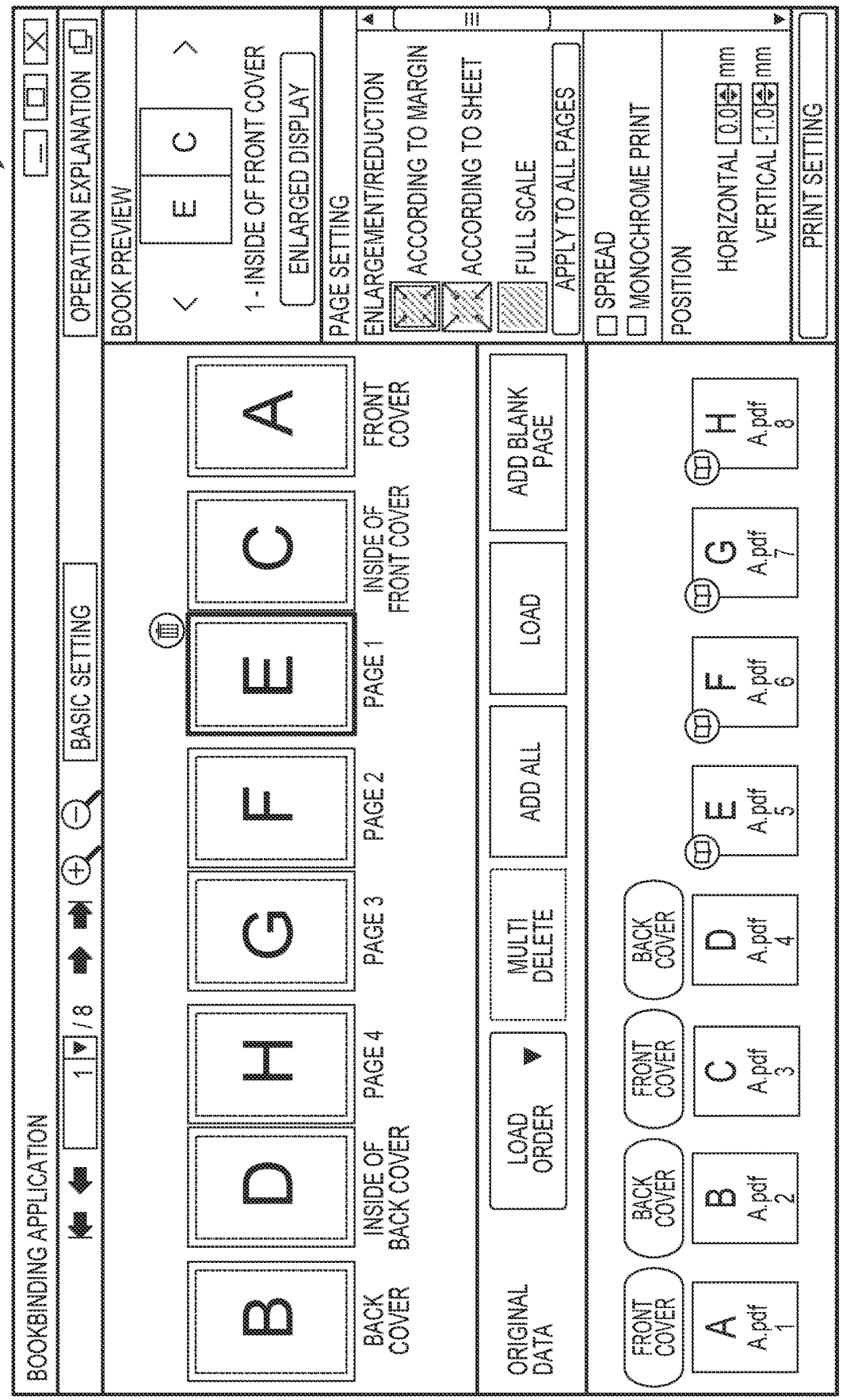
FIG. 6 is a view showing an example of the edit screen in the bookbinding application.

Case in Which Saddle Stitch Is Selected and Covers and Text Are Created by Same Type of Sheets Subsequently, an example of the edit screen when the binding method is saddle stitch (2-in-1), and the setting of using the same type of sheets for the covers and text is made will be described with reference to FIG. 6. The edit screen in this case is almost the same as that shown in FIG. 4. However, in the case of saddle stitch, the binding positions are between the pages, and thus the marks indicating the binding positions are not displayed, as shown in a screen example 600 of FIG. 6. Note that when printing on a paper surface, the marks indicating the binding positions may be displayed at predetermined positions between the pages.

Note that if the binding method is saddle stitch (2-in-1), 2-in-1 double-sided printing is executed, and thus the number of pages per sheet is four. Therefore, if the number of pages added to the edit region 401 is not a multiple of 4, a page such as a blank page can be added to the end so that the total number of pages is a multiple of 4.

Note that if the binding method is saddle stitch (2-in-1) and right-side binding is selected, when N represents the total number of pages and m is an integer of 0 or more, the front surface of one sheet including the (N/2+2m+2)th page on the right side and the (N/2−2m−1)th page on the left side is printed. Then, the back surface of the sheet including the (N/2−2m)th page on the right side and the (N/2+2m+1)th page on the left side is printed. If, for example, N=8, the front surface including the sixth page on the right side and the third page on the left side and the back surface including the fourth page on the right side (the back side of the third page) and the fifth page on the left side (the back side of the sixth page) are printed on both surfaces of one sheet. Similarly, the front surface including the eighth page on the right side and the first page on the left side and the back surface including the second page on the right side (the back side of the first page) and the seventh page on the left side (the back side of the eighth page) are printed on both surfaces of one sheet. The front surface on which the back cover is laid out on the right side and the front cover is laid out on the left side and the back surface on which the back surface of the front cover is laid out on the right side and the back surface of the back cover is laid out on the left side undergo double-sided printing. Note that the same applies to left-side binding except that the above relationship between the right and left sides is reversed.

Figure 7:
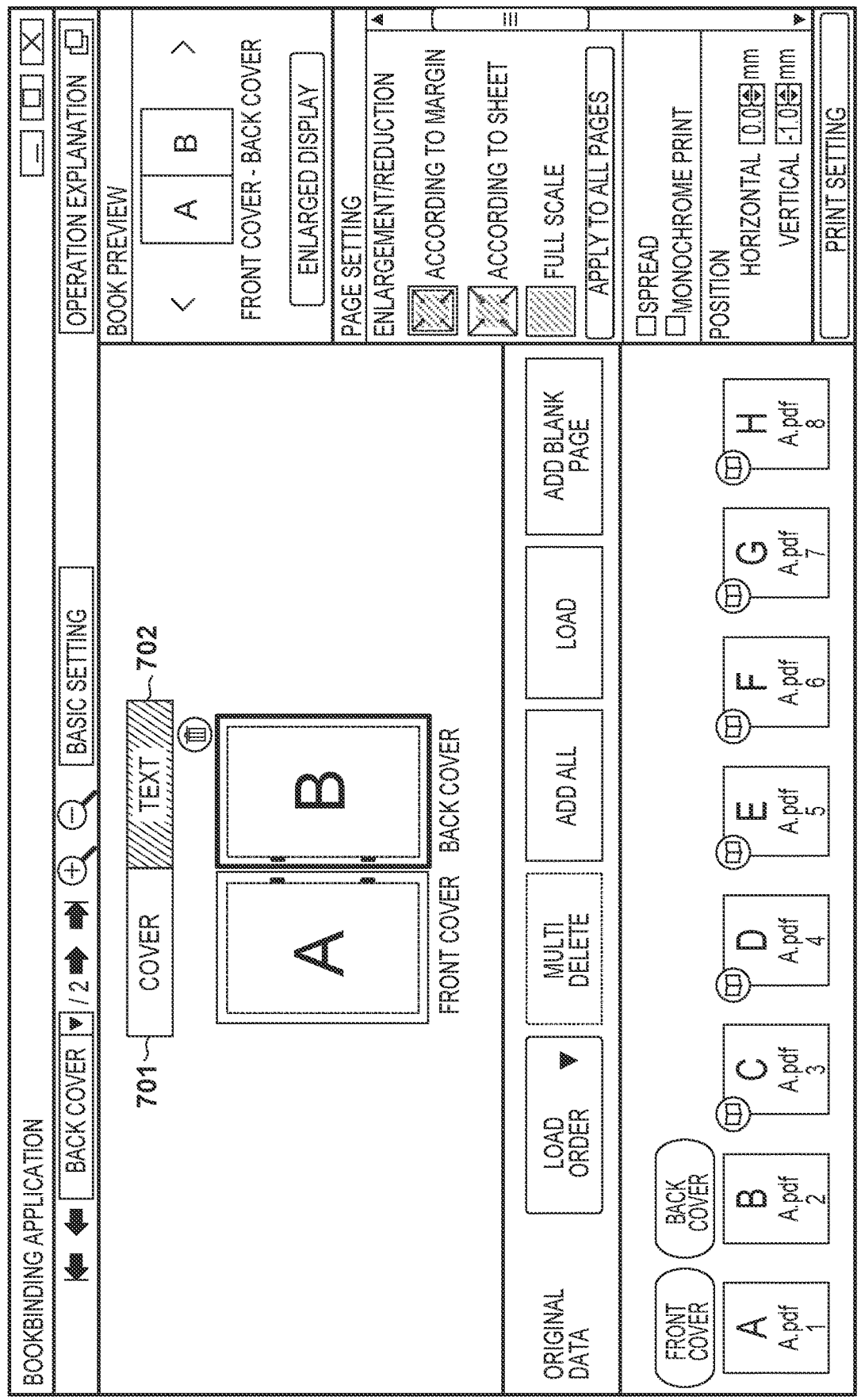
FIG. 7 is a view showing an example of the edit screen in the bookbinding application.
Figure 8:
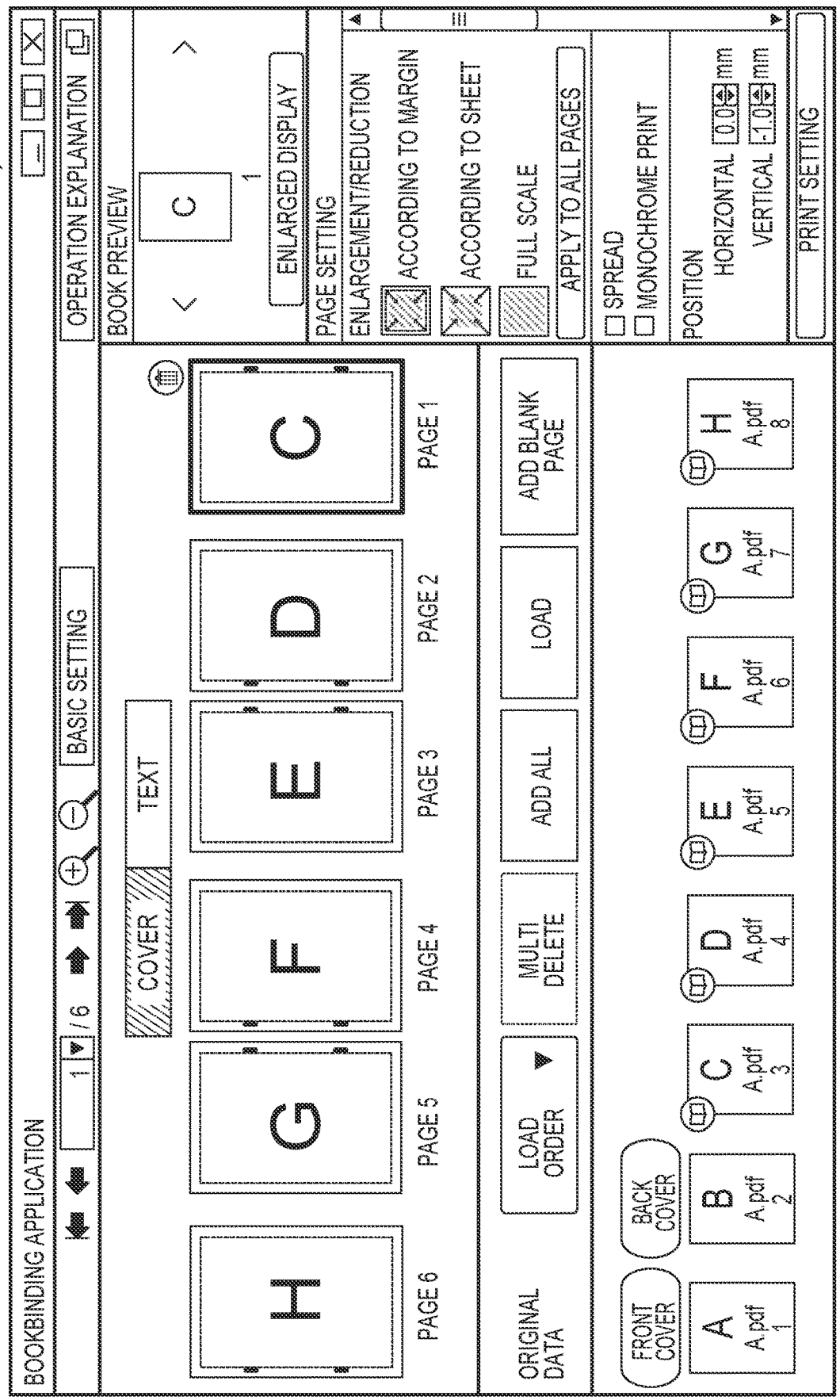
FIG. 8 is a view showing an example of the edit screen in the bookbinding application.

Case in Which Side Stitch is Selected and Covers and Text are Created by Different Types of Sheets Subsequently, an example of the edit screen when the binding method is side stitch (1-in-1) and the setting of using different types of sheets for the covers and text is made will be described with reference to FIGS. 7 and 8. When different types of sheets are used for the covers and text, a cover edit screen 700 shown in FIG. 7 and a text edit screen 800 shown in FIG. 8 are used. Note that this form need not always be used but at least the screen is configured to execute printing of the covers and text independently. That is, the user needs to individually issue a cover print instruction and a text print instruction to the bookbinding application 201. If the cover edit screen 700 and the text edit screen 800 are separated, buttons for switching between the edit screens, for example, a cover selection button 701 and a text selection button 702 in FIG. 7 are displayed in the edit region 401. When the user selects the cover selection button 701, the cover edit screen 700 shown in FIG. 7 is displayed. When the user selects the text selection button 702, the text edit screen 800 shown in FIG. 8 is displayed. Note that these buttons may be displayed outside the edit region 401. Instead of the form of the button, for example, a tab form may be used. That is, a tab for the cover edit screen and a tab for the text edit screen may be displayed, and one of the tabs may be selected to switch the screen.

In the cover edit screen, only the front cover and the back cover are displayed, as shown in FIG. 7. Note that the front cover and the back cover are displayed in a form when viewing the book from the spine side. That is, for right-side binding, the front cover is displayed on the left side and the back cover is displayed on the right side. On the other hand, for left-side binding, the front cover is displayed on the right side and the back cover is displayed on the left side. If side stitch is used, binding positions are displayed. However, in the cover edit screen, the binding positions are displayed on the center side when the front cover and the back cover are laid out side by side, as shown in FIG. 7. In the cover edit screen 700, the positional relationship between the front cover and the back cover is reversed, as compared with the edit screen, shown in FIG. 4 or 6, in which the covers and the text are collectively edited. This display allows the user to readily recognize how the book after bookbinding looks like from the spine side when the book is opened.

Note that in this embodiment, if different types of sheets are used for the covers and text, the back surface of the front cover or that of the back cover is not used (that is, the back surface is blank). The present invention, however, is not limited to this. If the back surface of the front cover or that of the back cover is used, the cover edit screen displays, for example, the back surface of the front cover adjacent to the front cover and the back surface of the back cover adjacent to the back cover. In the example of FIG. 7, the back surface of the front cover can be displayed on the left side of the front cover and the back surface of the back cover can be displayed on the right side of the back cover.

As shown in FIG. 8, in the text edit screen, the text except for the front cover and the back cover (and their back surfaces) is displayed in the edit region. The edit screen shown in FIG. 8 is the same as that shown in FIG. 4 except that the front cover, the back cover, and their back surfaces are not included.

Case in Which Saddle Stitch is Selected and Covers and Text are Created by Different Types of Sheets The edit screen when saddle stitch is selected and the setting of using different types of sheets for the covers and text is made is the same as that shown in FIG. 7 or 8 except that the marks of the binding positions are not displayed. Note that for saddle stitch, the number of pages needs to be a multiple of 4, as described above. However, if different types of sheets are used for the covers and text, the number of pages of the text needs to be a multiple of 4. That is, in the above-described example, adjustment is performed so that the total number of pages of the covers and text is a multiple of 4. In this example, however, adjustment is performed so that the number of pages of only the text is a multiple of 4. As a result, in this example, if the back surfaces of the covers undergo single-sided printing, the total number of pages of the covers and text is not a multiple of 4 (when a is an integer, the total number of pages is given by (4 a+2)). For example, if an edit operation is performed so that the text includes data for six pages, 2 blank pages or the like is inserted so that the number of pages of the text is a multiple of 4.

Figure 9:
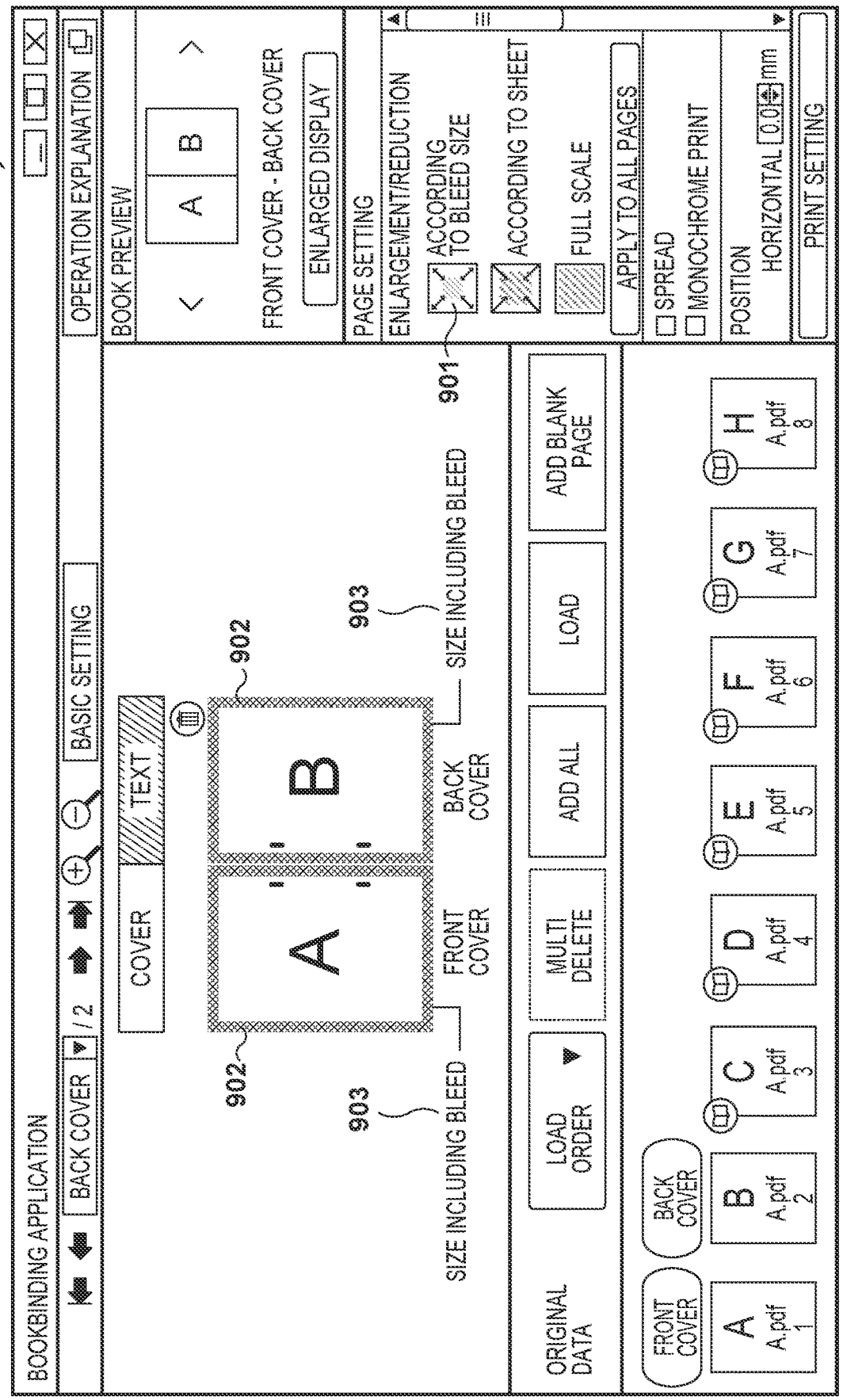
FIG. 9 is a view showing an example of the edit screen in the bookbinding application.

Note that if the setting of using different types of sheets for the covers and text is performed, the covers can undergo borderless printing by using, for example, glossy paper. FIG. 9 shows an example of the edit screen in this case. When executing borderless printing, so-called "bleed" needs to be added such that a print target image has a size larger than the finished size. Therefore, if paper such as glossy paper that can undergo borderless printing is selected, a region 902 of a size including bleed and an explanation 903 can be displayed. Furthermore, an option 901 used to adapt to a size including bleed by enlargement/reduction of page data is displayed. This allows the user to create covers by borderless printing by only performing a simple operation.

Upon completion of the edit processing using the screens shown in FIGS. 4 to 9, the user selects a print setting button included in each of these screens. The user performs further print setting processing using a print setting screen selected by selecting the print setting button, thereby selecting print execution. This processing sends application data generated by the bookbinding application to the printer driver corresponding to the printer selected in FIG. 3, and the printer driver generates print data based on the application data. Note that if the covers and text are printed on the same type of sheets, the application data includes pages laid out in the covers and the pages laid out in the text. On the other hand, if the covers and text are printed on the different types of sheets, the covers and the text are printed independently. Therefore, the above-described print setting screen prepares an option for selecting the covers or the text as a print target. In this case, if the user instructs printing in the state in which the covers are selected, the application data includes only pages laid out in the covers, and the printer driver generates print data for the covers. On the other hand, if the user instructs printing in the state in which the text is selected, the application data includes only pages laid out in the text, and the printer driver generates print data for the text.

An arrangement will be described below, in which after the page data of the file deployed in the original data region 402 are laid out in the edit region 401, the setting values of a selected (focused) page in the edit region 401 are collectively reflected on another page. This embodiment will describe the following examples as cases of applying collective reflection.

In one case, if the user selects the right page of pages forming a spared, the setting contents of the selected right page are applied to the right page of another spread. For example, if the second and third pages in FIG. 11 form a spread, and the user selects the second page, the setting contents of the second page are applied to the sixth page laid out on the right side of another spread. In another case, if the user selects the left page of pages forming a spread, the setting contents of the selected left page are applied to the left page of another spread. For example, if the second and third pages in FIG. 11 form a spread, and the user selects the third page, the setting contents of the third pages are applied to the seventh page laid out on the left side of another spread. In still another case, if the user selects pages on which page data with a spread attribute is laid out, the setting contents of the selected pages are applied to pages on which another page data with the spread attribute is laid out.

As described above, a page as a collective reflection target is different for each case. In this embodiment, display of a button for accepting a collective reflection instruction is changed in accordance with a form of allocation to the page selected by the user. Note that in this embodiment, a "button" will be described as a UI for accepting a collective reflection instruction. However, the present invention is not particularly limited to the button, and another UI arrangement such as an icon may be used as long as the UI arrangement can accept a collective reflection instruction.

Figure 11:
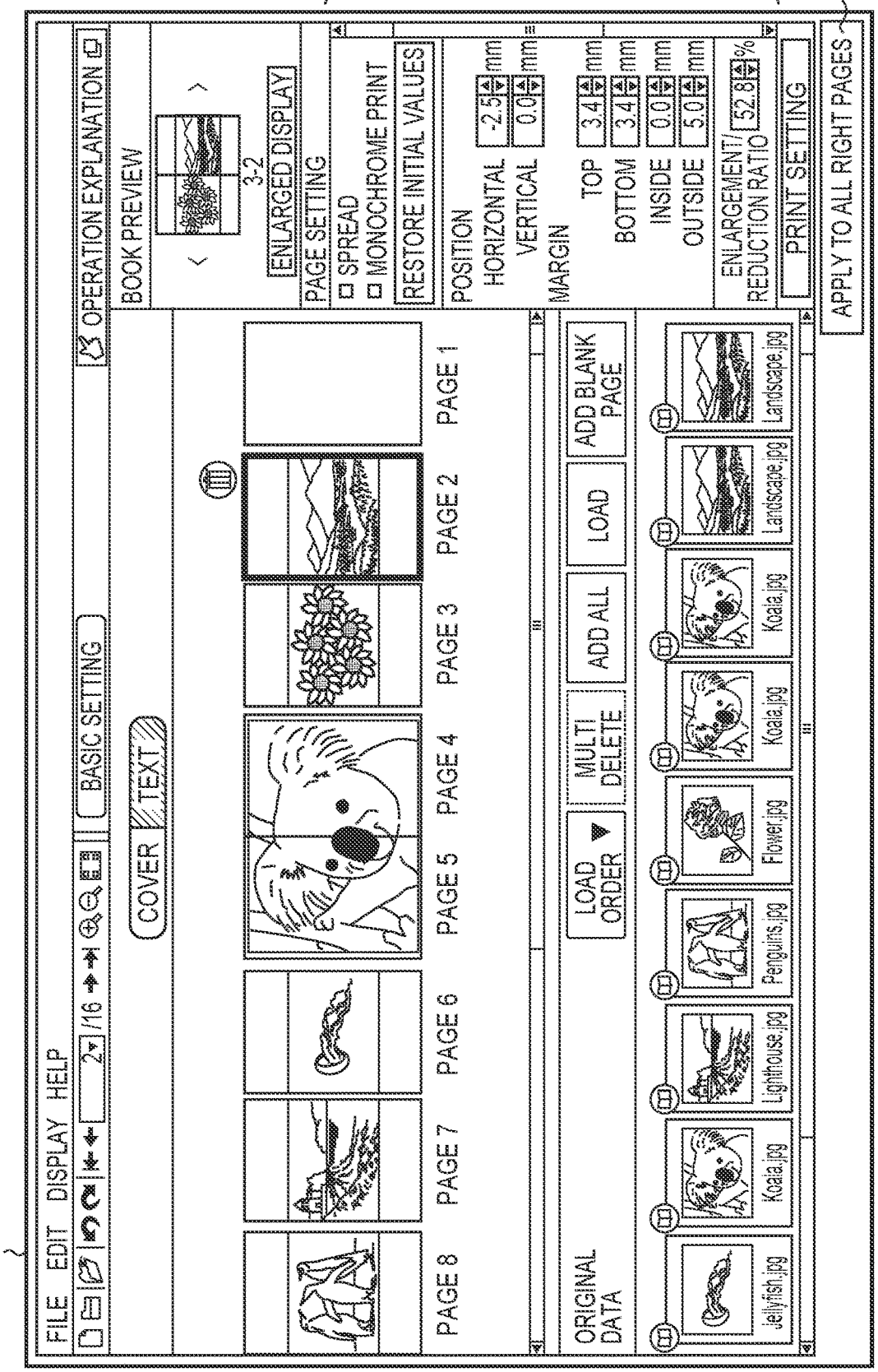
FIG. 11 is a view for explaining the display of the button for accepting a collective reflection instruction.

FIG. 11 is a view showing a screen 1100 including the edit region 401 where the page data included in the original data are allocated, and a state in which the user selects page 2. In page setting 1101, page setting items and setting values corresponding to selected page 2 are displayed. The page setting items include the position of an image and margin settings in the page. However, an item except for those shown in FIG. 11 may be included in the page setting 1101. Since page 2, that is, the right page of a pair of pages that can be spread is selected in FIG. 11, display of a button 1102 indicates "apply to all right pages". Note that although not shown in FIG. 11, if no page is selected in the edit region 401, display of the button 1102 is set to default display. For example, as default display, a message for prompting the user to perform an operation, such as "Please select one of pages. A reflection destination is indicated here.", may be displayed.

Figure 12:
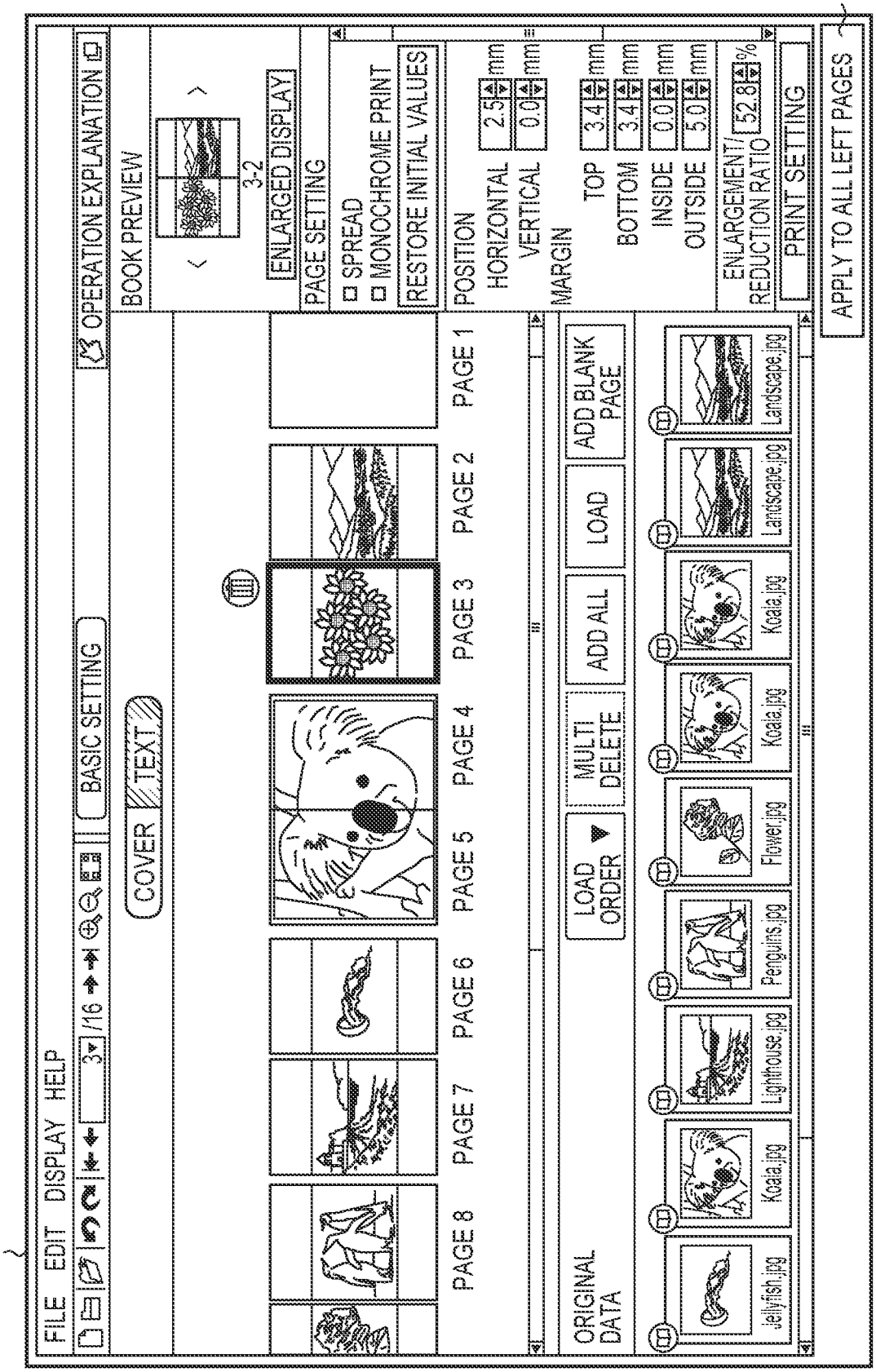
FIG. 12 is a view for explaining the display of the button for accepting a collective reflection instruction.

FIG. 12 is a view showing a screen 1200 including the edit region 401 where the page data included in the original data are allocated, and a state in which the user selects page 3. Since page 3, that is, the left page of the pair of pages forming the spread is selected in FIG. 12, display of a button 1201 indicates "apply to all left pages". Note that although not shown in FIG. 12, if no page is selected in the edit region 401, display of the button 1201 is set to default display, similar to the button 1102.

Figure 13:
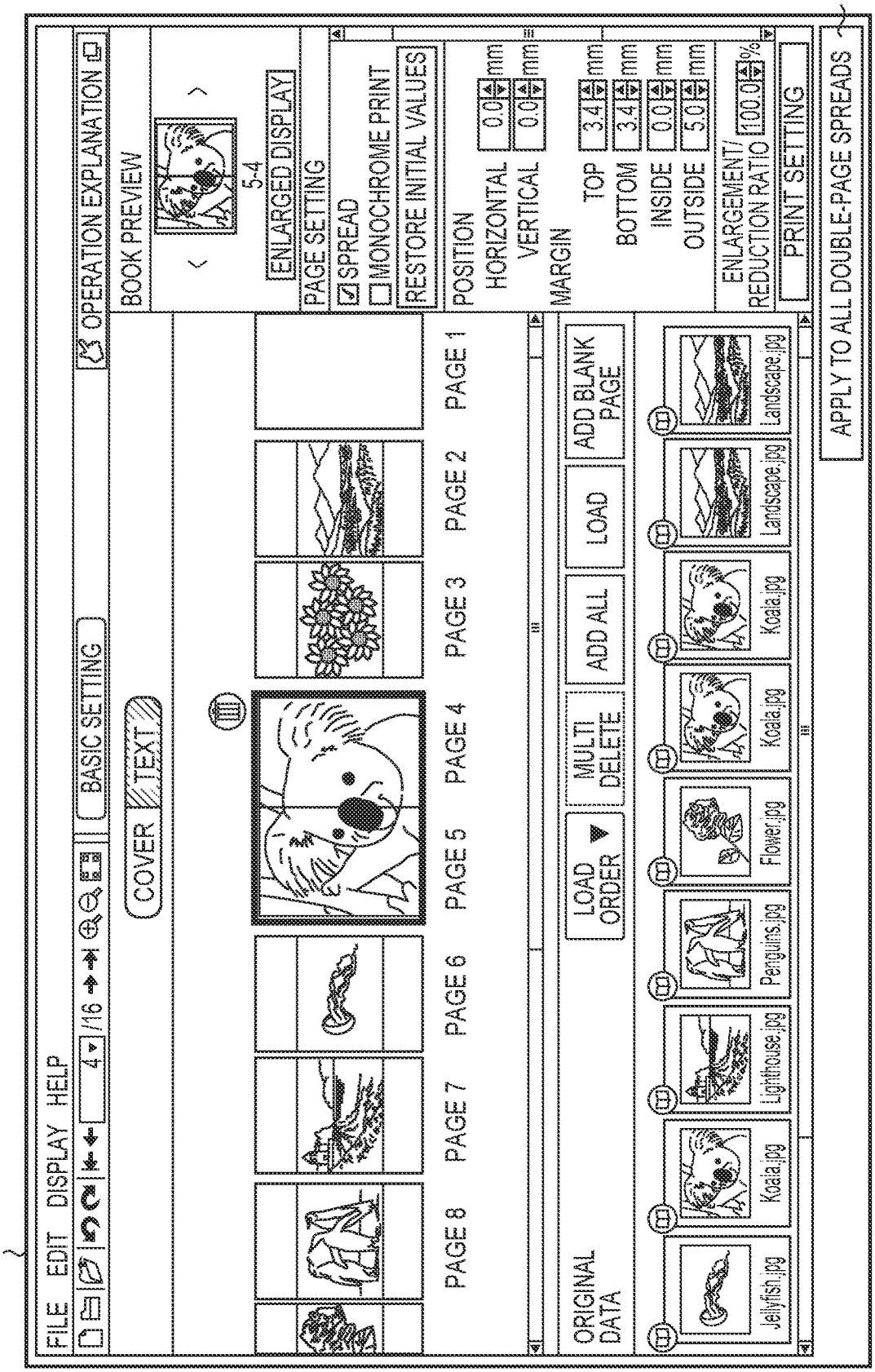
FIG. 13 is a view for explaining the display of the button for accepting a collective reflection instruction.

FIG. 13 is a view showing a screen 1300 including the edit region 401 where the page data included in the original data are allocated, and a state in which the user selects pages 4 and 5 over which page data is laid out. That is, FIG. 13 is a view showing a state in which pages where the above-described page data set with the spread attribute is laid out are selected. Note that the pages where the page data set with the spread attribute is laid out will sometimes simply be referred to as a double-page spread hereinafter. Since the double-page spread is selected in FIG. 13, display of a button 1301 indicates "apply to all double-page spreads". Note that although not shown in FIG. 13, if no pages are selected in the edit region 401, display of the button 1301 is set to default display, similar to the button 1102.

Figure 10:
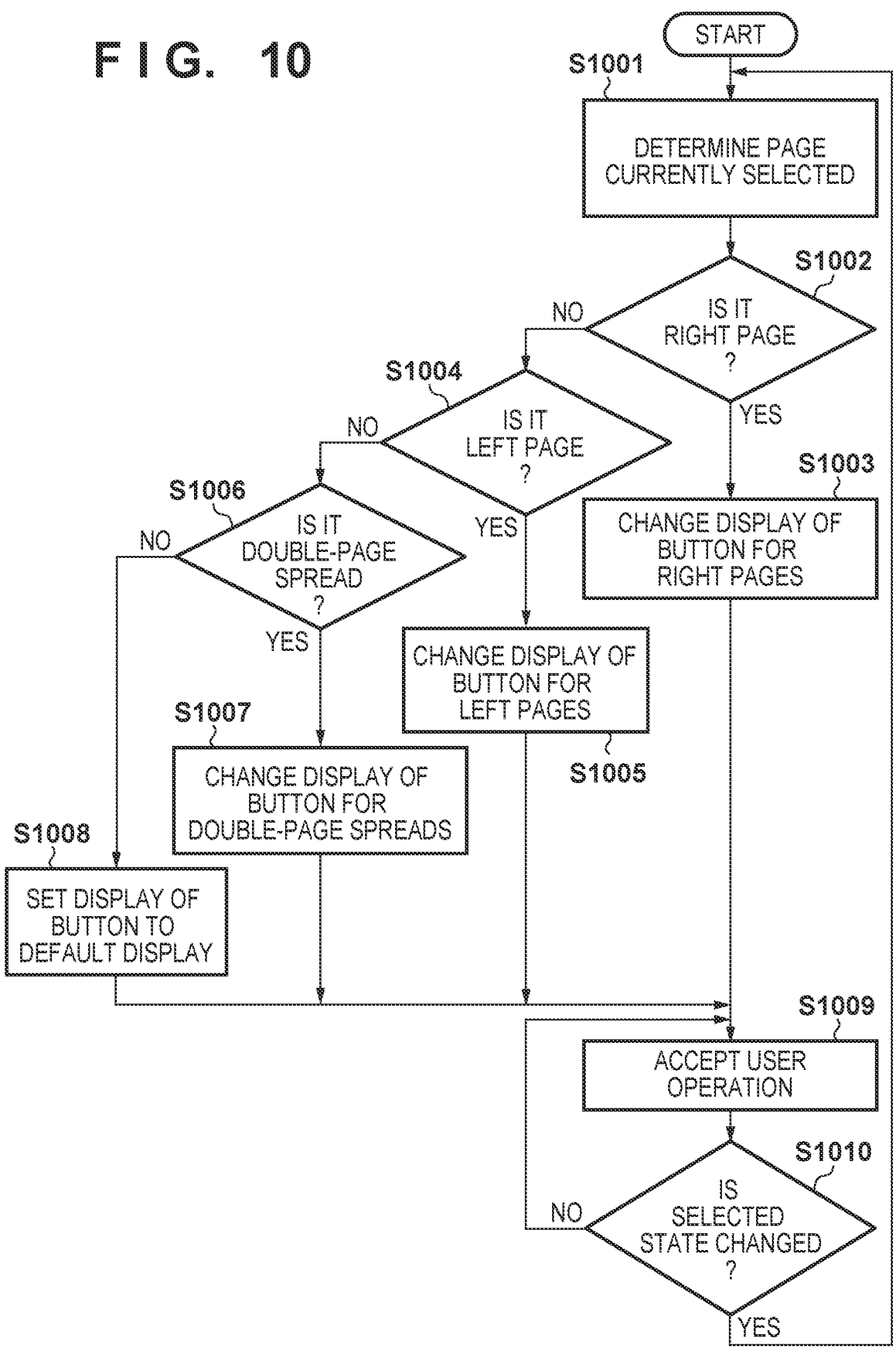
FIG. 10 is a flowchart illustrating processing of changing display of a button for accepting a collective reflection instruction.

FIG. 10 is a flowchart illustrating display control processing of changing the display of the button for accepting a collective reflection instruction in accordance with the page selection state by the user. Each process shown in FIG. 10 is implemented when, for example, the CPU 103 loads the program stored in the ROM 104 into the RAM 105 and executes it. The processing shown in FIG. 10 starts when page allocation is performed for contents of a file loaded in the original data region 402. At the start of the processing shown in FIG. 10, the display of each of the buttons 1102, 1201, and 1301 is set to the default display. Note that the buttons 1102, 1201, and 1301 may be referred to as instruction items hereinafter.

In step S1001, the CPU 103 determines a page currently selected by the user in the edit region 401. The determination processing in step S1001 includes determination of whether there is a selected page. The CPU 103 refers to information indicating the attribute of the currently selected page. Based on the reference result, the CPU 103 determines whether the above-described right page, left page, or double-page spread is currently selected.

In step S1002, the CPU 103 determines whether the determination result in step S1001 indicates that there is a selected page and the right page is currently selected. If it is determined that there is a selected page and the right page is currently selected, the process advances to step S1003, and the CPU 103 changes the display contents of the button from the default display to display for collective reflection on all the right pages. After the processing in step S1003 is executed, the display of the button 1102 in FIG. 11 is obtained. The display contents are not limited to those of the button 1102, and graphics, pattern display, or the like may be adopted as long as contents indicate collective reflection on all the right pages. After step S1003, the process advances to step S1009. On the other hand, if it is determined that the determination conditions in step S1002 are not satisfied, the process advances to step S1004.

In step S1004, the CPU 103 determines whether the determination result in step S1001 indicates that there is a selected page and the left page is currently selected. If it is determined that there is a selected page and the left page is currently selected, the process advances to step S1005, and the CPU 103 changes the display contents of the button from the default display to display for collective reflection on all the left pages. After the processing in step S1005 is executed, the display of the button 1201 in FIG. 12 is obtained. The display contents are not limited to those of the button 1201, and graphics, pattern display, or the like may be adopted as long as contents indicate collective reflection on all the left pages. After step S1005, the process advances to step S1009. On the other hand, if it is determined that the determination conditions in step S1004 are not satisfied, the process advances to step S1006.

In step S1006, the CPU 103 determines whether the determination result in step S1001 indicates that there is a selected page and the double-page spread is currently selected. If it is determined that there is a selected page and the double-page spread is currently selected, the process advances to step S1007, and the CPU 103 changes the display contents of the button from the default display to display for collective reflection on all the double-page spreads. After the processing in step S1007 is executed, the display of the button 1301 in FIG. 13 is obtained. The display contents are not limited to those of the button 1301, and graphics, pattern display, or the like may be adopted as long as contents indicate collective reflection on all the double-page spreads. After step S1007, the process advances to step S1009. On the other hand, if it is determined that the determination conditions in step S1006 are not satisfied, the process advances to step S1008.

An example of a case in which the process advances from step S1006 to step S1008 is a case in which there is no page selected by the user. In addition, for example, if there is no original data to be used as a page allocation target, the process advances from step S1006 to step S1008. In step S1008, the CPU 103 sets the display of the button to the default display. After step S1008, the process advances to step S1009.

In step S1009, the CPU 103 accepts a user operation in the screen 1100, 1200, or 1300, or the screen in the default display state in step S1008. In step S1010, the CPU 103 determines whether the selected state is changed. For example, if, in a state in which the right page is selected, the user selects a double-page spread, it is determined that the selected state is changed, and the processing in step S1001 is repeated. On the other hand, if it is determined that the selected state remains unchanged, the processing in step S1009 is repeated.

As described above, according to this embodiment, the display of the button for collective reflection on another page is changed in accordance with the page selection state by the user. As a result, for example, even if the user wants to reflect the page setting contents collectively on a plurality of double-page spreads existing in the book data, he/she need not select instruction items for corresponding reflection destinations from a plurality of menus. Therefore, it is possible to improve the user operability.

An operation when the user presses each of the buttons 1102, 1201, and 1301 will be described next.

Figure 16A:
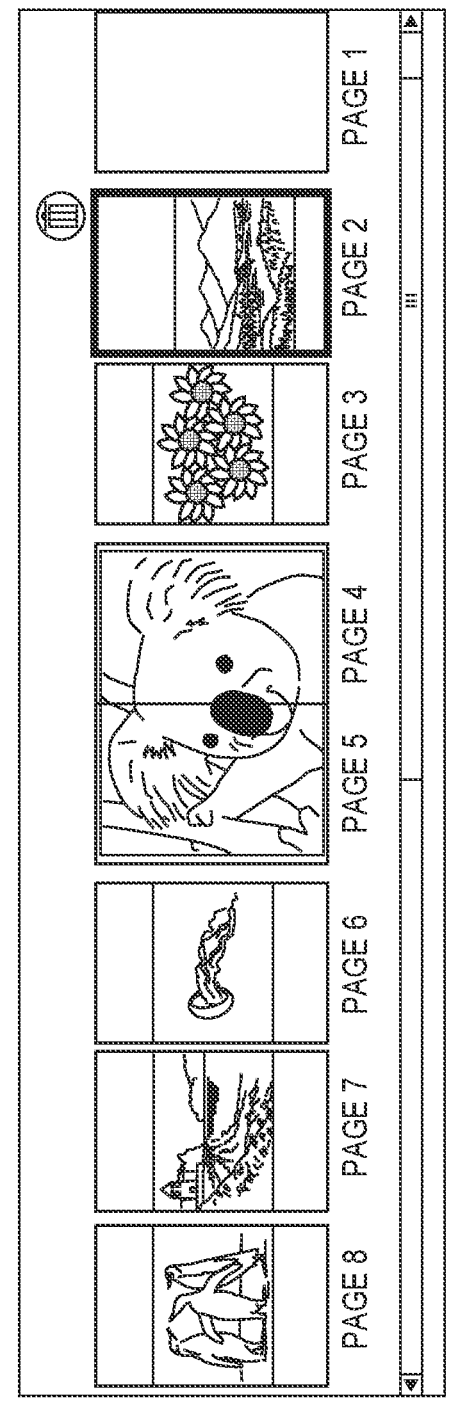
FIGS. 16A and 16B are views for explaining a change of display before and after application of collective reflection.
Figure 16B:
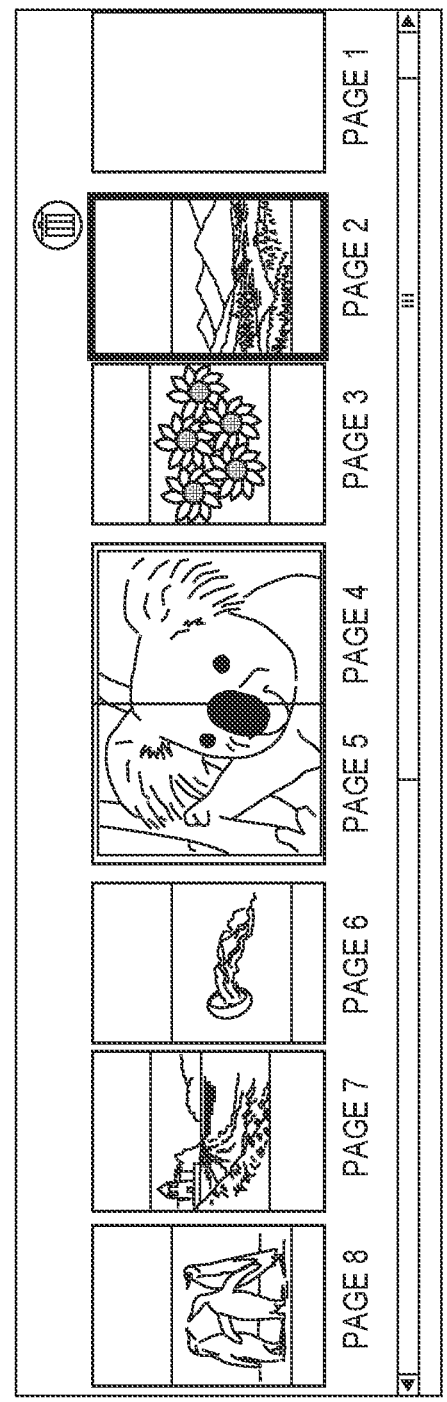

FIG. 16A is a view showing a state before application to all the right pages (before collective reflection) in the screen 1100 of FIG. 11. FIG. 16B is a view showing a state after application to all the right pages (after collective reflection) in the screen 1100. Note that FIGS. 16A and 16B each show only a portion corresponding to the edit region 401 of the screen 1100.

FIG. 16A shows a state in which for page 2 selected by the user, a page setting is made by setting the page setting 1101 by the user so that the position of the image is shifted downward. At this time, since the button 1102 has not been pressed, the position of the image (page data) of only page 2 is shifted downward, as shown in FIG. 16A.

FIG. 16B shows a state after application to all the right pages is performed by pressing the button 1102 by the user in the state shown in FIG. 16A. As shown in FIG. 16B, page setting contents similar to those of page 2 are also reflected on pages 6 and 8. Note that the page setting contents of page 2 are not reflected on the double-page spread of pages 4 and 5.

Figure 17A:
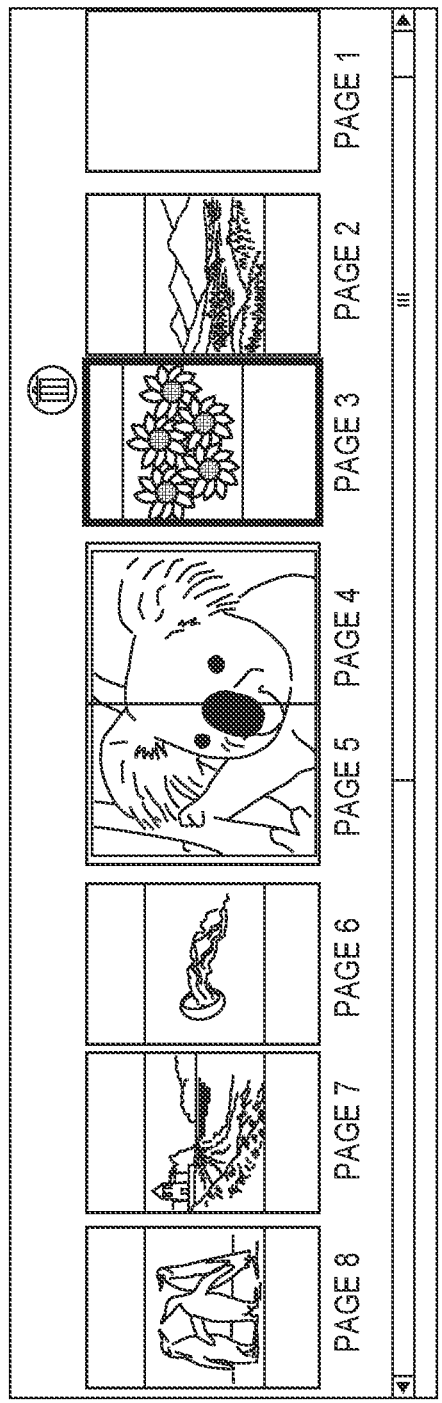
FIGS. 17A and 17B are views for explaining a change of display before and after application of collective reflection.
Figure 17B:
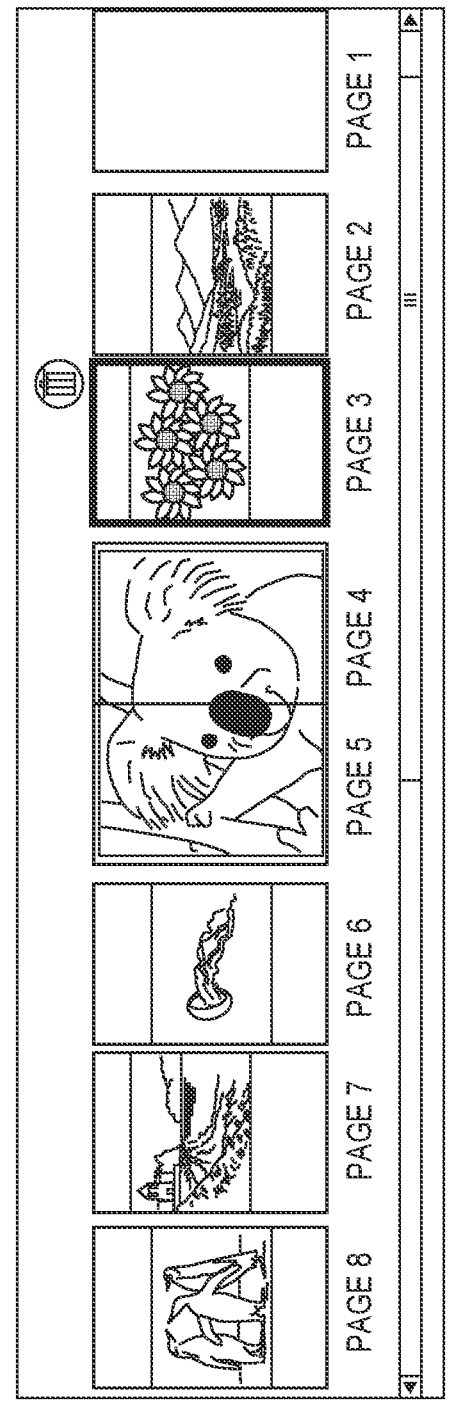

FIG. 17A is a view showing a state before application to all the left pages in the screen 1200 of FIG. 12. FIG. 17B is a view showing a state after application to all the left pages in the screen 1200. Note that FIGS. 17A and 17B each show only a portion corresponding to the edit region 401 of the screen 1200.

FIG. 17A shows a state in which for page 3 selected by the user, a page setting is made by setting the page setting 1101 by the user so that the position of the image (page data) is shifted upward. At this time, since the button 1201 has not been pressed, the position of the image of only page 3 is shifted upward, as shown in FIG. 17A.

FIG. 17B shows a state after application to all the left pages is performed by pressing the button 1201 by the user in the state shown in FIG. 17A. As shown in FIG. 17B, page setting contents similar to those of page 3 are also reflected on pages 7 and 9. Note that the page setting contents of page 3 are not reflected on the double-page spread of pages 4 and 5.

FIG. 18A shows a state in which for the double-page spread of pages 10 and 11 selected by the user, a page setting is made by setting the page setting 1101 by the user so that the position of the image (the page data with the spread attribute) is shifted downward. At this time, since the button 1301 has not been pressed, the position of the image of only the double-page spread of pages 10 and 11 is shifted downward, as shown in FIG. 18A.

FIG. 18B shows a state in which application to all the double-page spreads is performed by pressing the button 1301 by the user in the state shown in FIG. 18A. As shown in FIG. 18B, page setting contents similar to those of the double-page spread of pages 10 and 11 are also reflected on the double-page spread of pages 4 and 5 and that of pages 12 and 13.

Figure 14:
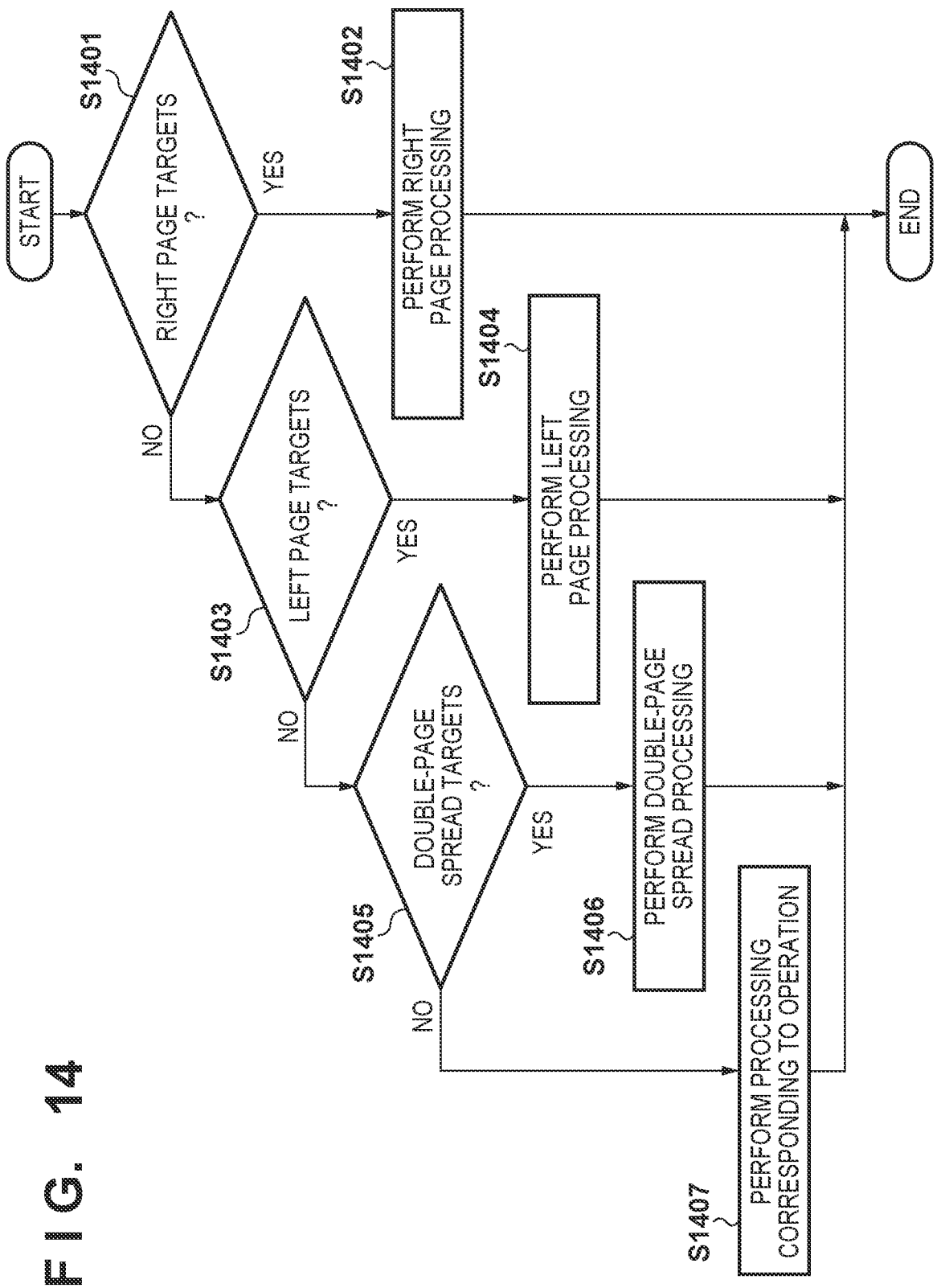
FIG. 14 is a flowchart illustrating processing for applying collective reflection.

FIG. 14 is a flowchart concerning page setting reflection processing. Each process shown in FIG. 14 is implemented when, for example, the CPU 103 loads the program stored in the ROM 104 into the RAM 105 and executes it. The processing shown in FIG. 14 starts when the user performs an operation on the screen 1100, 1200, or 1300, or the screen including the button undergoing default display in step S1008 of FIG. 10.

In step S1401, the CPU 103 determines whether collective reflection targets are the right pages. If, for example, the button 1102 is pressed, the CPU 103 determines that collective reflection targets are right pages. If it is determined that collective reflection targets are the right pages, the process advances to step S1402, and the CPU 103 performs right page processing (to be described later). After step S1402, the processing shown in FIG. 14 ends. On the other hand, if it is determined that collective reflection targets are not the right pages, the process advances to step S1403.

In step S1403, the CPU 103 determines whether the collective reflection targets are the left pages. If, for example, the button 1201 is pressed, the CPU 103 determines that the collective reflection targets are the left pages. If it is determined that the collective reflection targets are the left pages, the process advances to step S1404, and the CPU 103 performs left page processing (to be described later). After step S1404, the processing shown in FIG. 14 ends. On the other hand, if it is determined that the collective reflection targets are not the left pages, the process advances to step S1405.

In step S1405, the CPU 103 determines whether the collective reflection targets are the double-page spreads. If, for example, the button 1301 is pressed, the CPU 103 determines that the collective reflection targets are the double-page spreads. If it is determined that the collective reflection targets are the double-page spreads, the process advances to step S1406, and the CPU 103 performs double-page spread processing (to be described later). After step S1406, the processing shown in FIG. 14 ends. On the other hand, if it is determined that the collective reflection targets are not the double-page spreads, the process advances to step S1407.

In step S1407, the CPU 103 performs processing corresponding to a button pressed on the screen, thereby ending the processing shown in FIG. 14. Furthermore, if the pressing of a button that is inactive is detected, the CPU 103 ignores the operation.

Figure 15:
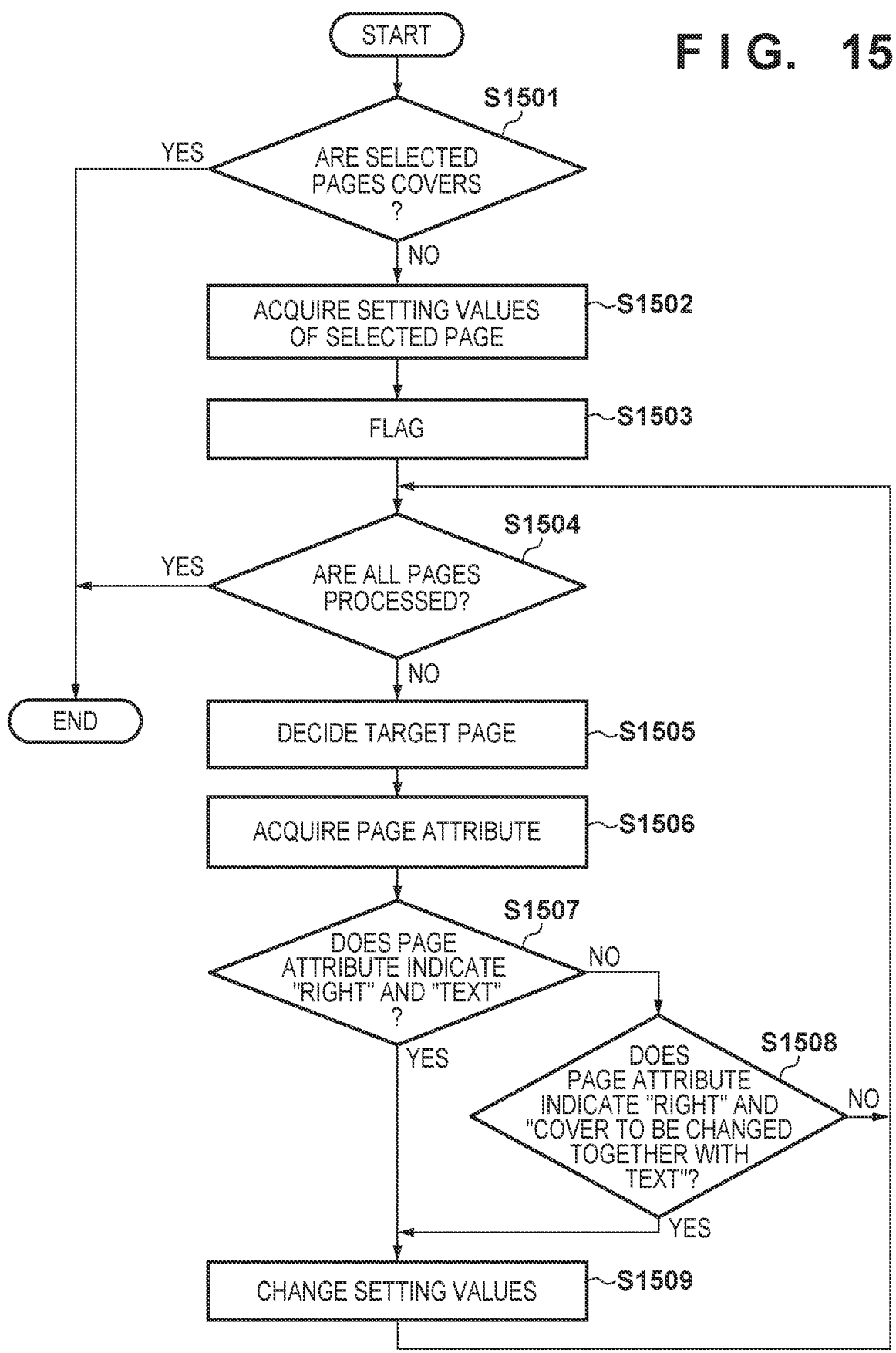
FIG. 15 is a flowchart illustrating the processing for applying collective reflection.

FIG. 15 is a flowchart illustrating the processing in step S1402 of FIG. 14. In step S1501, the CPU 103 determines whether the covers are currently selected. The covers include the front cover and the black cover. If it is determined that the covers are currently selected, the processing shown in FIG. 15 ends. On the other hand, if the covers are not currently selected, that is, a page of "text" is currently selected, the process advances to step S1502. The processing in step S1501 is executed when sheets of different types are used for the covers and text. If sheets of the same type are used for the covers and text, the processing in step S1501 is skipped and the processing in step S1502 is executed.

In step S1502, the CPU 103 acquires the setting values of the setting contents of the selected page (for example, page 2 in FIG. 11), and holds the setting values as collective reflection setting values in the storage area such as the RAM 105. In this example, the right page is selected. The setting values are, for example, the setting values of the page setting 1101 of FIG. 11. In step S1503, the CPU 103 activates a "collective reflection flag" for the original data as the current page allocation target. The CPU 103 refers to the collective reflection flag when a page operation such as a page addition or insertion operation is executed after collective reflection is performed. Processing when a page operation is executed after collective reflection is performed will be described later.

In step S1504, the CPU 103 determines whether the following processing has been performed for all the pages. If it is determined that the processing has been performed for all the pages, the processing shown in FIG. 15 ends; otherwise, the CPU 103 decides, in step S1505, a page to be processed. As an initial value, the first page or the covers may be decided.

In step S1506, the CPU 103 acquires the page attribute of the target page. In step S1507, the CPU 103 determines whether the condition that the acquired page attribute indicates the "right page" and "text" is satisfied. If it is determined that the condition is satisfied, the CPU 103 changes, in step S1509, the setting values of the page setting of the target page to the setting values held in step S1502. After step S1509, the processing in step S1504 is repeated. On the other hand, if it is determined that the condition is not satisfied, the process advances to step S1508.

In step S1508, the CPU 103 determines whether the condition that the acquired page attribute indicates the "right page" and the "cover to be changed together with the text" is satisfied. The cover to be changed together with the text corresponds to, for example, a case in which sheets of the same type are used for the text and covers. If it is determined that the condition is satisfied, the process advances to step S1509. On the other hand, if sheets of different types are used for the text and covers, for example, plain paper and glossy paper are used, the CPU 103 determines that the condition in step S1508 is not satisfied, and the process returns to step S1504. A result of performing steps S1504 to S1509 for all the pages is as shown in FIG. 16B.

The processing in step S1404 of FIG. 14 will be described. For step S1404, in step S1502, the CPU 103 acquires the setting values of the setting contents of the selected page (the left page in this explanation). In step S1507, the CPU 103 determines whether the condition that the acquired page attribute indicates the "left page" and "text" is satisfied. In step S1508, the CPU 103 determines whether the condition that the acquired page attribute indicates the "left page" and the "cover to be changed together with the text" is satisfied. The remaining processes are the same as the contents described above with reference to FIG. 15. A result of performing steps S1504 to S1509 for all the pages is as shown in FIG. 17B.

The processing in step S1406 of FIG. 14 will be described. For step S1406, in step S1502, the CPU 103 acquires the setting values of the setting contents of the selected page (the double-page spread in this explanation). In step S1507, the CPU 103 determines whether the condition that the acquired page attribute indicates the "double-page spread" and "text" is satisfied. In step S1508, the CPU 103 determines whether the condition that the acquired page attribute indicates the "double-page spread" and the "cover to be changed together with the text" is satisfied. The remaining processes are the same as the contents described above with reference to FIG. 15. A result of performing steps S1504 to S1509 for all the pages is as shown in FIG. 18B.

As described above, according to this embodiment, the setting contents of the selected page are reflected collectively on other pages when the user only changes the setting contents of the selected page and presses the button. This arrangement can improve the user convenience.

An operation when a page is newly inserted after applying collective reflection by the processing shown in FIG. 15 will be described next.

Figure 19:
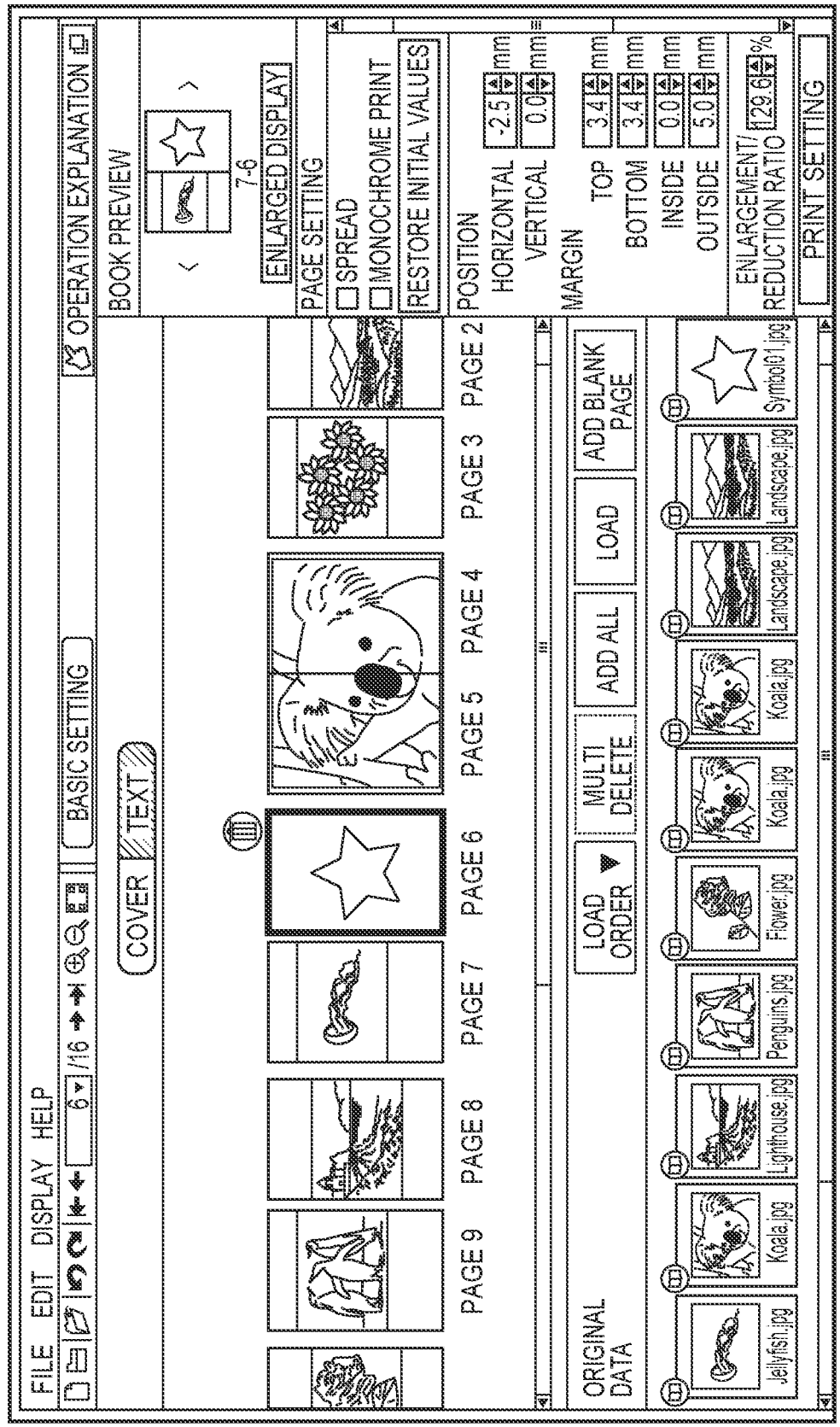
FIG. 19 is a view for explaining a case in which a page operation is performed after application of collective reflection.

A case will be described first, in which a star image is inserted as page 6, as shown in FIG. 19, after the setting contents of the left page selected by the user for collective reflection are applied to all the left pages, as shown in FIG. 17B. In the case shown in FIG. 19, the page data of the star image is allocated to the right page of a spread region forming a spread, and the setting contents of the left page selected by the user for collective reflection are not reflected. Furthermore, since the star image is inserted, allocation of the page data to the pages after page 7 is shifted by one page. Then, as a result of shifting allocation by one page, the page data (castle and tulip) allocated to the left pages of the spreads are allocated to the right pages of other spreads. Consequently, the page data allocated to the right pages of the spreads return to a state before application (collective reflection). On the other hand, as a result of shifting allocation by one page, the page data (jellyfish and penguins) allocated to the right pages of the spreads are allocated to the left pages. Consequently, the page data allocated to the left pages are displayed and printed based on the setting values of the left page selected by the user for collective reflection.

Figure 20:
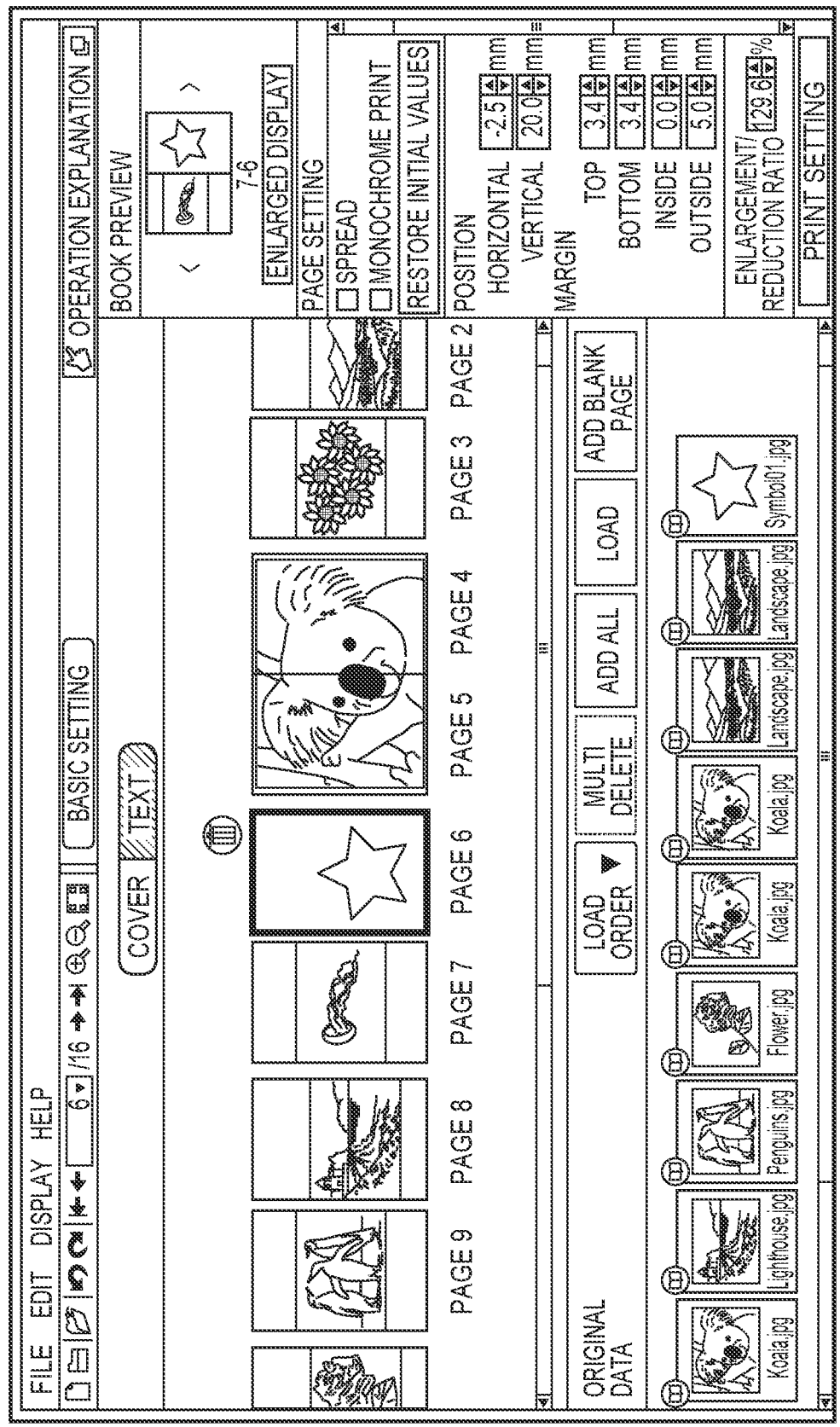
FIG. 20 is a view for explaining a case in which a page operation is performed after application of collective reflection.

Next, a case will be described, in which the page data of the star image is inserted as page 6, as shown in FIG. 20, after the setting contents of the right page selected by the user for collective reflection are applied to all the right pages, as shown in FIG. 16B. In the case shown in FIG. 20, the page data of the star image is allocated to the right page of the spread, and the setting contents of the right page selected by the user for collective reflection are reflected. Furthermore, since the page data of the star image is inserted, allocation of the page data to the pages after page 7 is shifted by one page. Then, as a result of shifting allocation by one page, the page data (castle and tulip) allocated to the left pages of the spreads are allocated to the right pages. Consequently, the page data allocated to the right pages are displayed and printed based on the setting values of the right page selected by the user for collective reflection. On the other hand, as a result of shifting allocation by one page, the page data (jellyfish and penguins) allocated to the right pages of the spreads are allocated to the left pages. Consequently, these page data return to a state before application (collective reflection).

In this embodiment, as described with reference to FIG. 15, whether to change the setting values is decided based on not the page data but the page attribute (indicating the right page or the like). Therefore, if the form of allocation of the page data is changed by inserting a page after collective reflection is performed, the display and print contents of the respective page data are changed in accordance with the form of allocation to the pages after the change. Furthermore, similarly, if the page is deleted after collective reflection is performed, the display and print contents of the respective page data are changed in accordance with the form of allocation of the page data after the change. According to this embodiment, with this arrangement, the user need not perform an operation of selecting a page and pressing the button again after a page operation is performed, thereby improving the operability.

Figure 21:
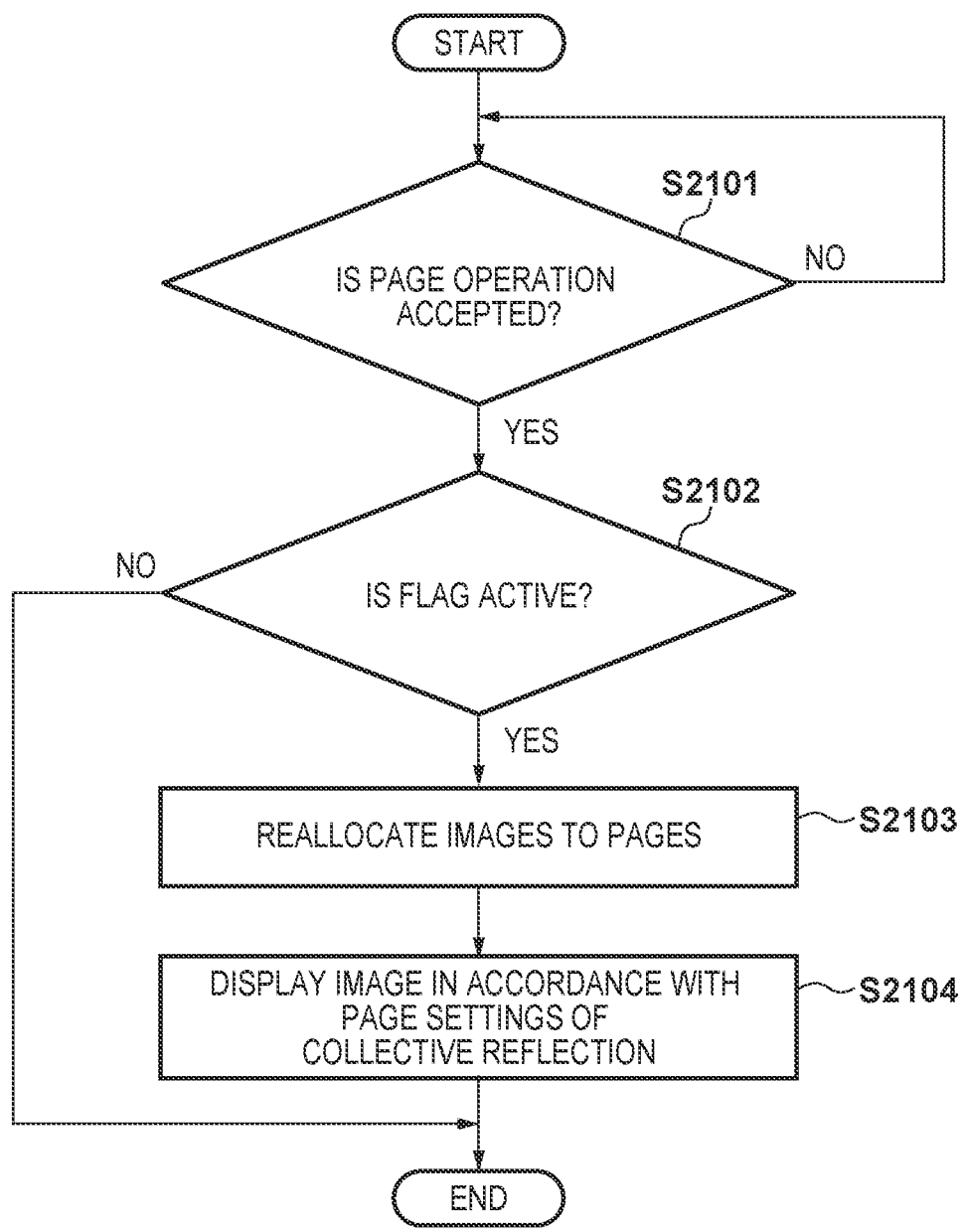
FIG. 21 is a flowchart illustrating processing when a page operation is executed after collective reflection is performed.

FIG. 21 is a flowchart illustrating processing when a page operation is executed after collective reflection is performed. Each process shown in FIG. 21 is implemented when, for example, the CPU 103 loads the program stored in the ROM 104 into the RAM 105 and executes it.

In step S2101, the CPU 103 determines whether a page operation is accepted. The page operation includes page insertion or deletion. If it is determined that the page operation is accepted, the process advances to step S2102; otherwise, the processing in step S2101 is repeated.

In step S2102, the CPU 103 determines whether the "collective reflection flag" is active. If it is determined that the flag is active, the process advances to step S2103; otherwise, the above-described collective reflection processing may not be performed, and thus the processing shown in FIG. 21 ends.

In step S2103, the CPU 103 reallocates the images (page data) to the pages in accordance with the page operation. For example, if page data is added, the CPU 103 reallocate the subsequent page data so that the images are shifted by one page. In step S2104, the CPU 103 displays the page data in accordance with the page settings of collective reflection. For example, if the left pages are collective reflection targets, the contents of the page settings set for collective reflection are reflected on the page data laid out on the left pages after reallocation. After step S2104, the processing shown in FIG. 21 ends.

Display in each of a case in which the covers form a spread and a case in which the covers form no spread when sheets of the same type are used for the covers and text will be described next.

Figure 22:
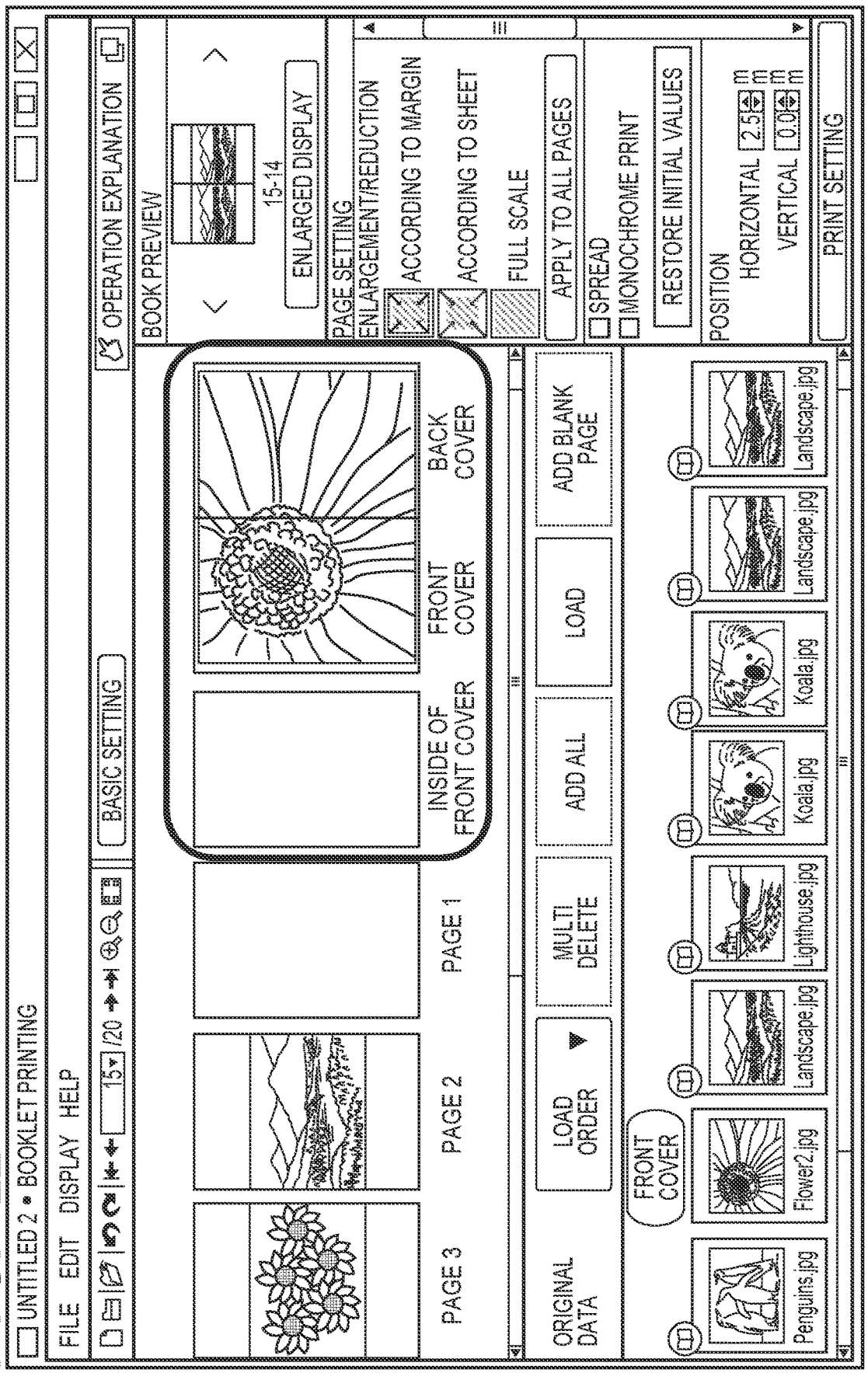
FIG. 22 is a view for explaining display when covers form a spread.

FIG. 22 is a view showing an example of display of the edit region 401 when sheets of the same type are used for the covers and text and the page data set with the spread attribute is laid out on the covers. As shown in FIG. 22, the front cover and the back cover form a double-page spread. In this case, the front cover and the back cover are laid out and displayed side by side, as indicated by a region surrounded by a circle. Furthermore, page data laid out inside the front cover is displayed to the left of the front cover. This is because right-side binding is selected. If left-side binding is selected, the inside of the front cover is displayed to the right of the front cover. That is, the horizontal direction of display of the pages is opposite between right-side binding and left-side binding, and the same applies to the subsequent views. This arrangement allows the user to readily recognize the double-page spread formed by the front cover and the back cover.

Figure 23:
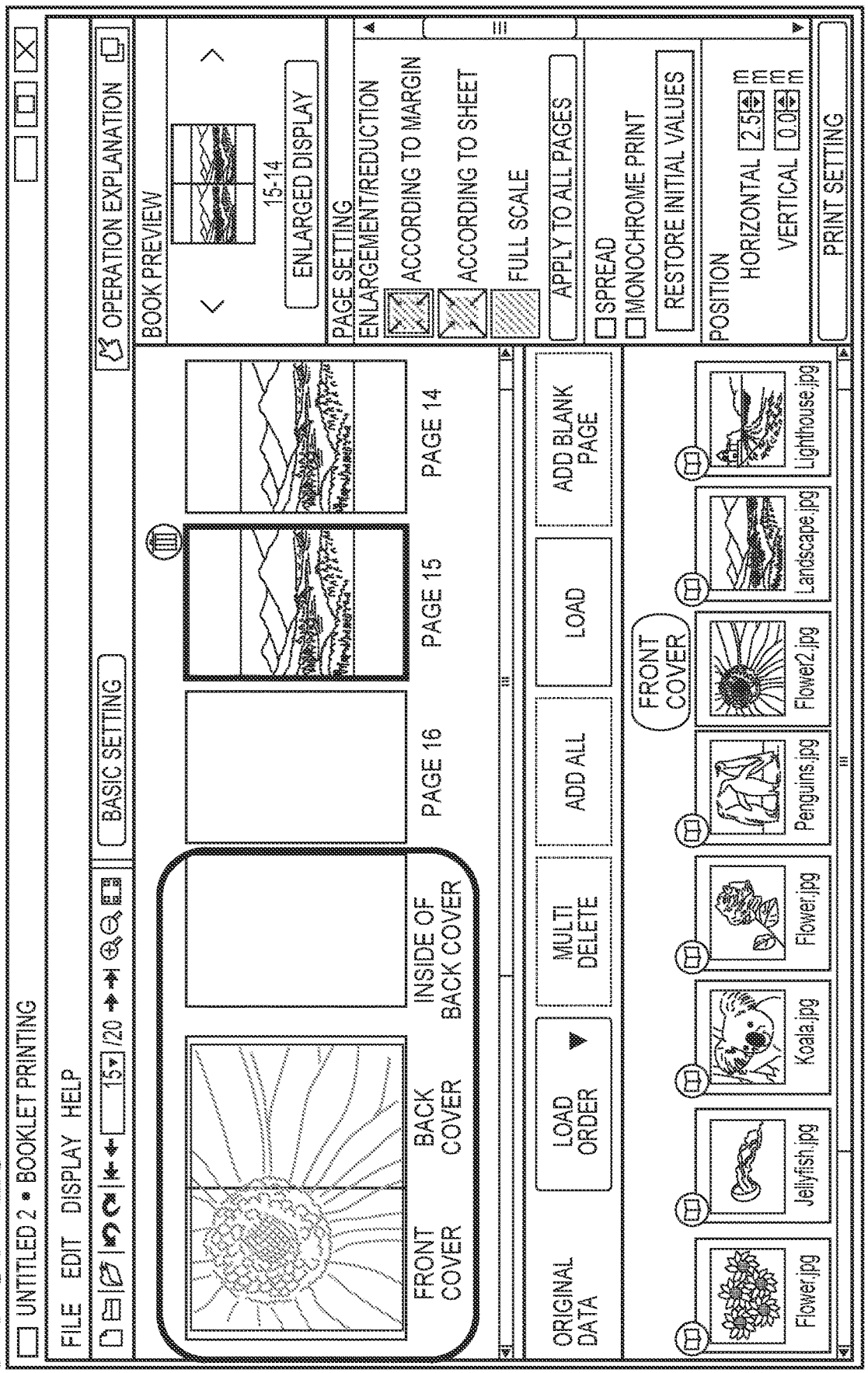
FIG. 23 is a view for explaining display when the covers form the spread.

FIG. 23 is a view showing an example of display of a portion around the back cover, which corresponds to FIG. 22. As shown in FIG. 23, the page data of the back cover is displayed to the left of the inside of the back cover. At this time, the page data of the front cover is displayed to the left of the back cover, thereby allowing the user to recognize that the front cover and the back cover form the double-page spread. Furthermore, in FIG. 23, the double-page spread formed by the front cover and the back cover is displayed to be distinguished from other pages. For example, in FIG. 23, the double-page spread is displayed slightly thinly, as compared with other pages. This is because if the display is slid rightward, the double-page spread is already displayed in FIG. 22, and the user can recognize that the front cover and the back cover displayed in FIG. 23 are not included in the actual number of pages.

Figure 24:
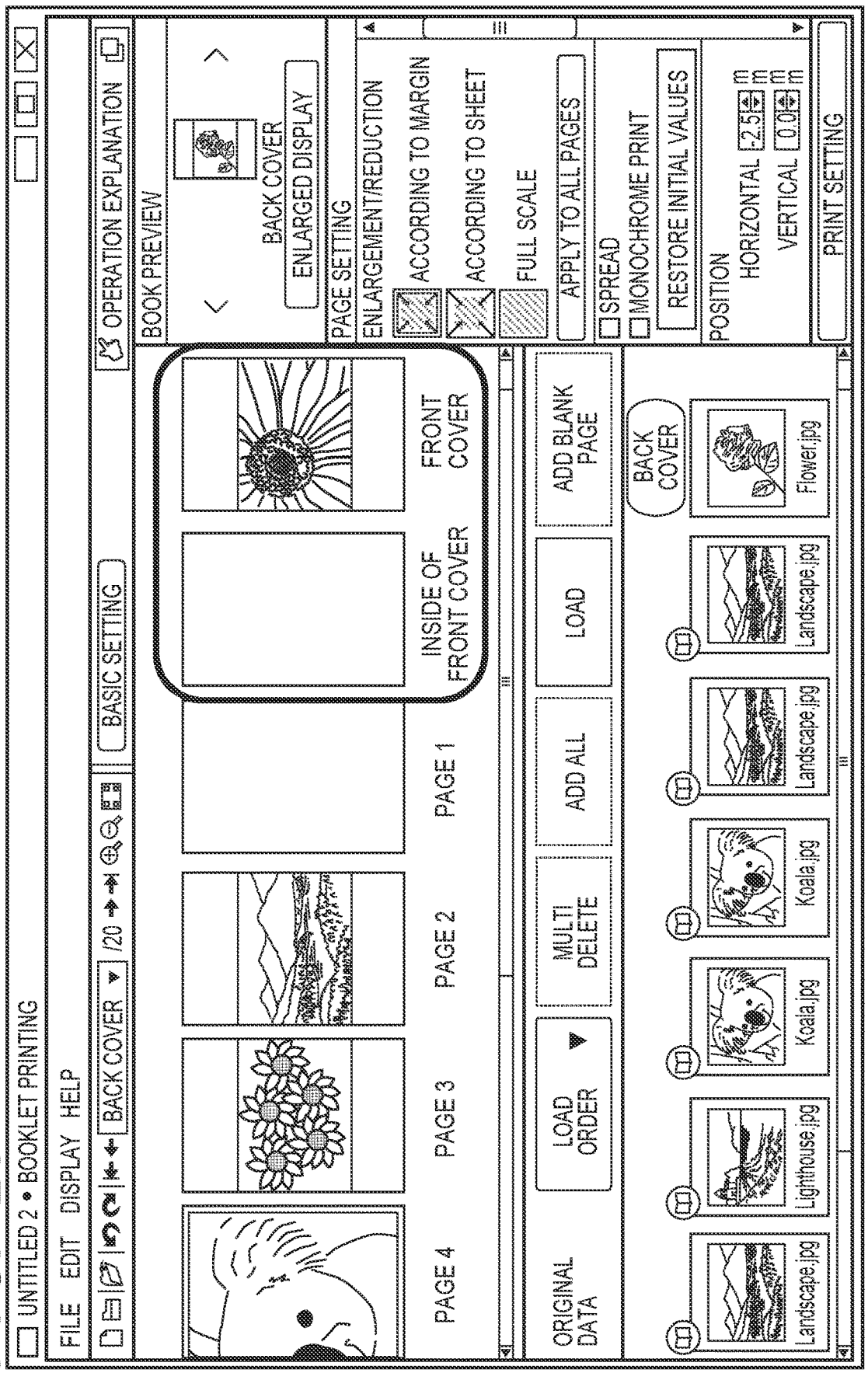
FIG. 24 is a view for explaining display when the covers form no spread.

FIG. 24 is a view showing an example of the display of the edit region 401 when sheets of the same type are used for the covers and text and no page data with the spread attribute is laid out on the covers. In this case, the front cover and its inside are displayed and no back cover is displayed, as indicated by a region surrounded by a circle.

Figure 25:
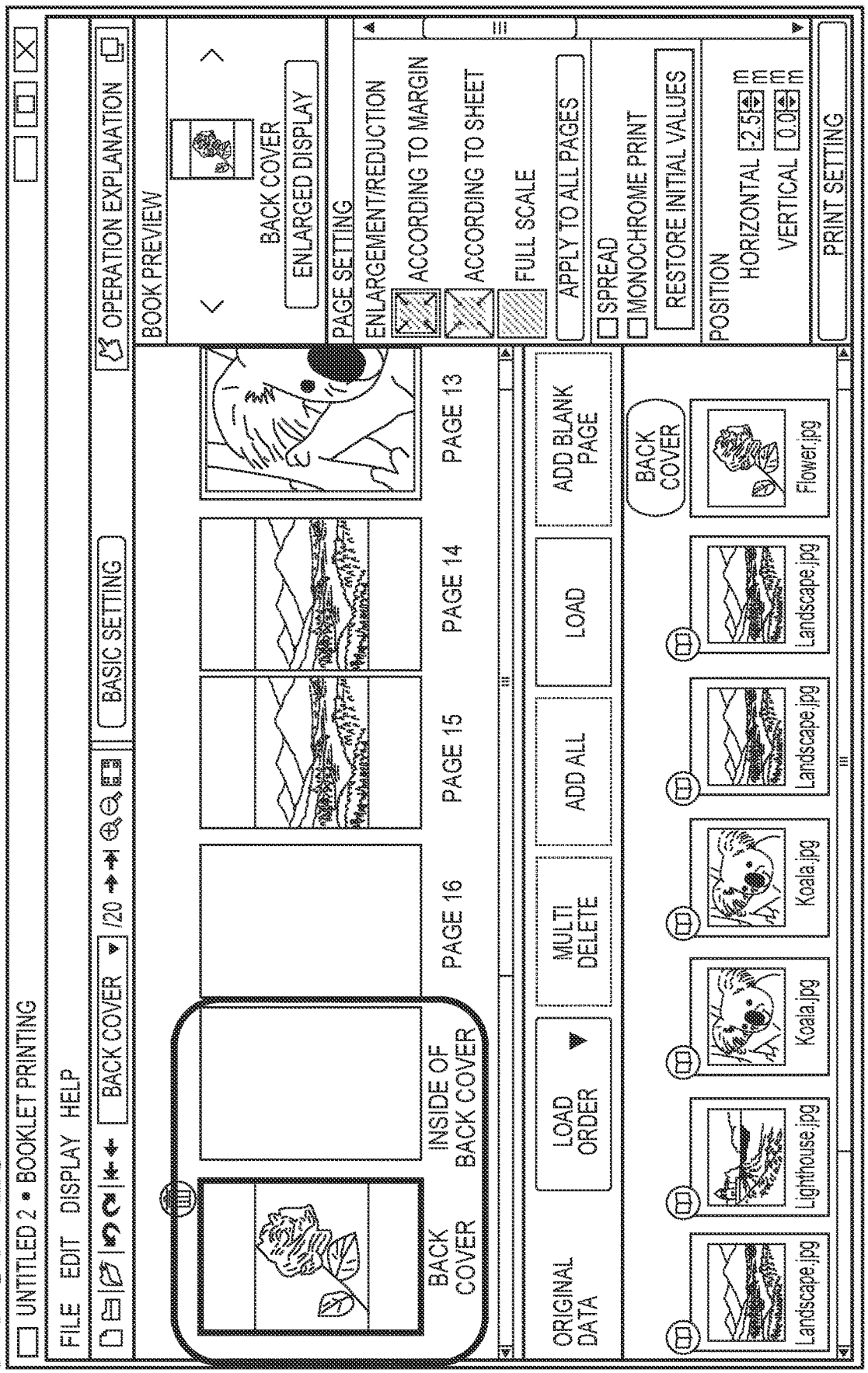
FIG. 25 is a view for explaining display when the covers form no spread.

FIG. 25 is a view showing an example of display of a portion around the back cover, which corresponds to FIG. 24. As shown in FIG. 25, the back cover is displayed to the left of the inside of the back cover. At this time, the front cover is not displayed. Unlike FIG. 23, the back cover is displayed in FIG. 25 in the same manner as that for other pages.

The display when sheets of the same type are used for the covers and text has been explained with reference to FIGS. 22 to 25. However, if sheets of different types are used for the covers and text, the covers and text are separately displayed, as shown in FIGS. 7 and 8, as already described.

Figure 26:
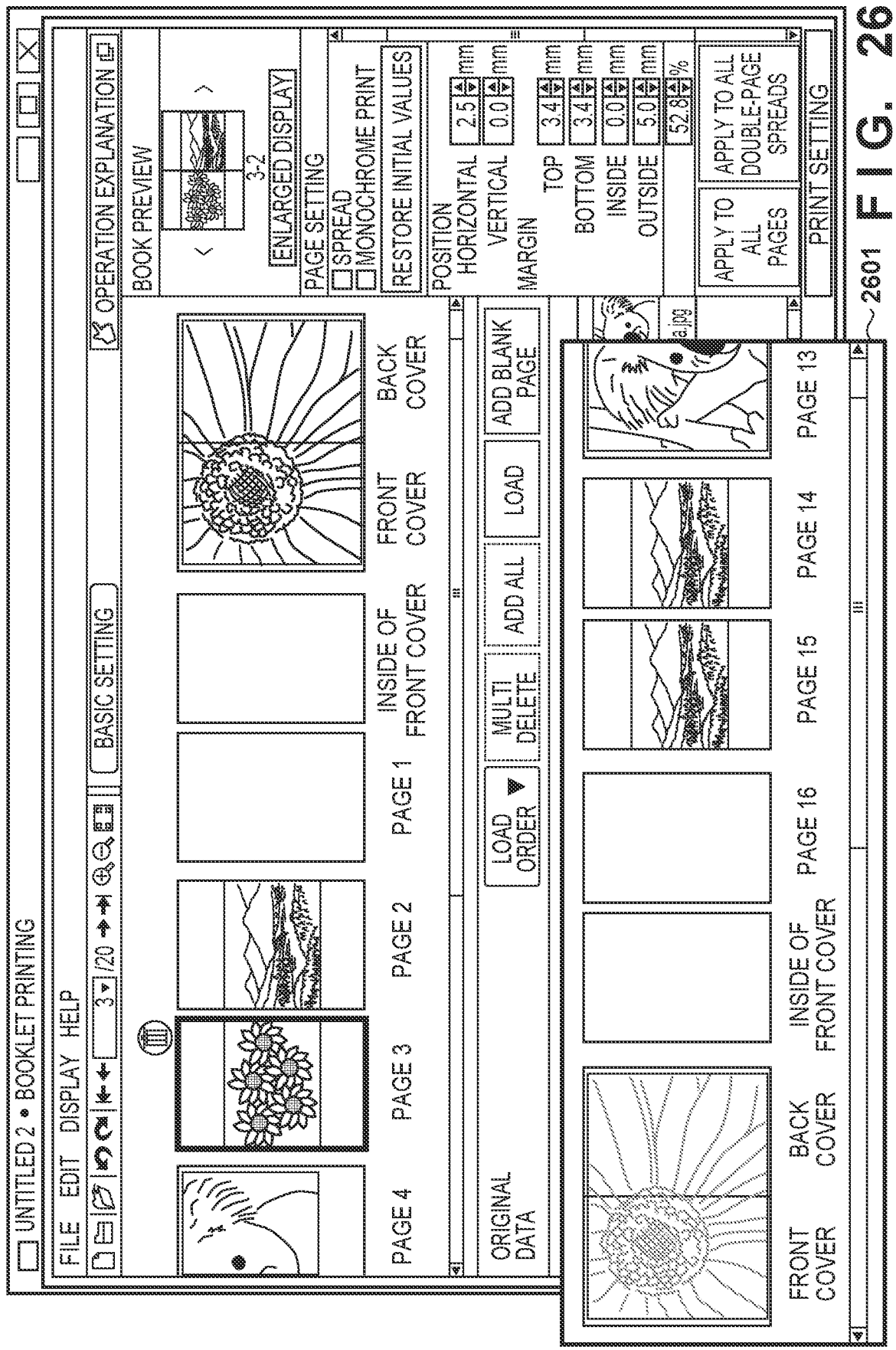
FIG. 26 is a view showing a state before application of collective change of the settings of a double-page spread.

FIG. 26 is a view showing the screen before the settings of the selected double-page spread are applied to other double-page spreads. In FIG. 26, the double-page spread of pages 4 and 5 is selected. Furthermore, in FIG. 26, a portion of the edit region 401, obtained by sliding the slide bar of the edit region 401 leftward until the back cover is displayed, is shown as a screen 2601. In FIG. 26, the page data with the spread attribute laid out on the double-page spread of pages 4 and 5 is shifted upward by setting the page setting 1101 by the user.

Figure 27:
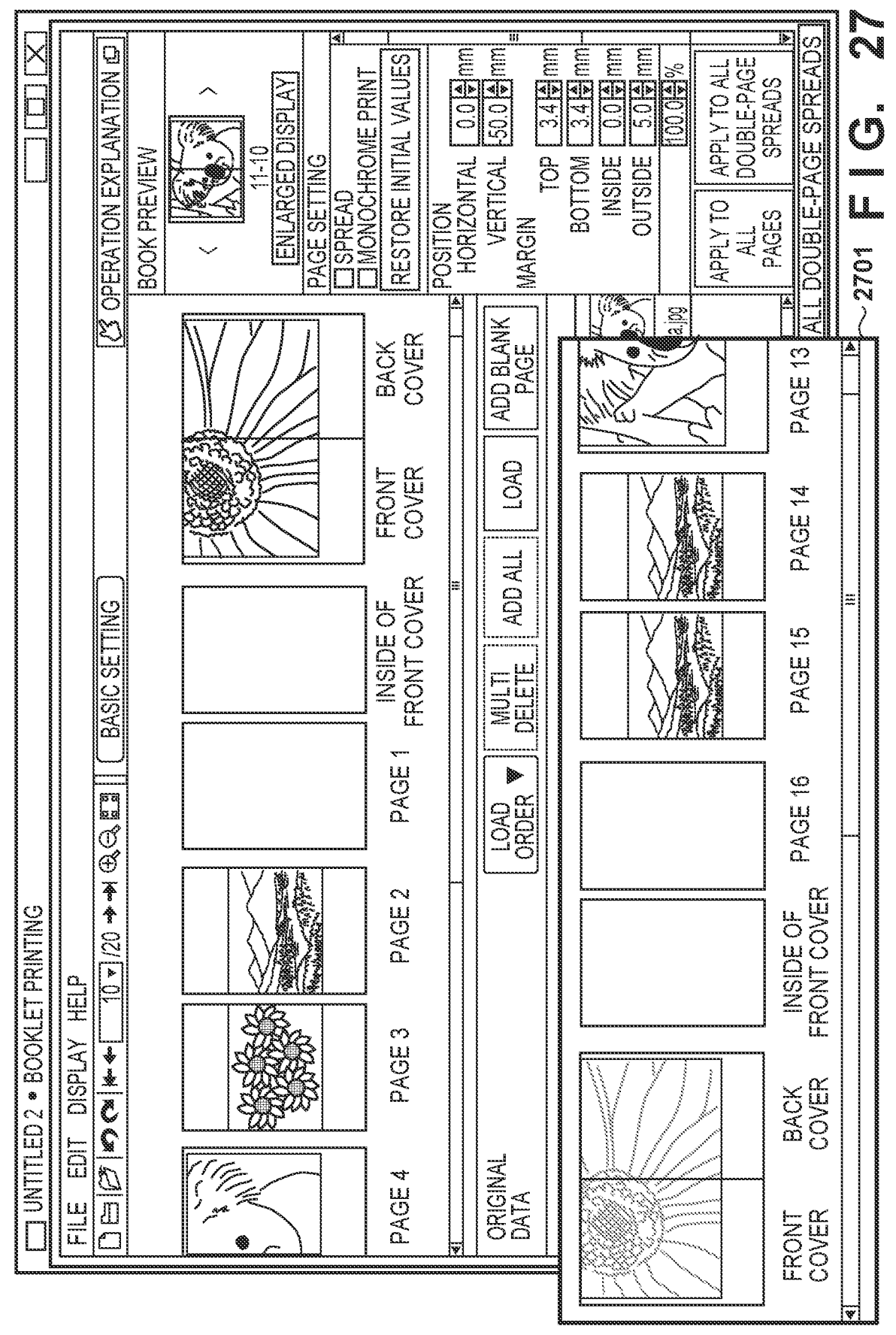

FIG. 27 is a view showing a screen after the settings of the selected double-page spread are applied to other double-page spreads. As shown in FIG. 27, the settings are reflected on not only the double-page spread of pages 4 and 5 and other double-page spreads of the text but also the double-page spread of the front cover and the back cover. Furthermore, display is performed by applying the settings to not only the double-page spread of the front cover and the back cover located adjacent to the inside of the front cover but also the double-page spread of the front cover and the back cover located adjacent to the inside of the back cover.

As described above, even if sheets of the same type are used for the covers and text and the covers form a spread, the user can readily recognize how the settings of the double-page spread are reflected on the double-page spread of the front cover and the back cover by collectively reflecting the settings of the double-page spread.

The application destinations of the setting values of the selected page according to this embodiment will be summarized below. FIGS. 28A, 28B, and 28C show tables each showing a list of the application destinations of the setting values of the selected page.

A table 2801 is a table when sheets of different types are used for the covers and text. If the user selects a right page of the text, the right pages of the text are set as the application destinations of collective reflection regardless of whether the form of the covers is a spread or not (application destinations 2802 and 2803). If the user selects a left page of the text, the left pages of the text are set as the application destinations of collective reflection regardless of whether the form of the covers is a spread or not (application destinations 2804 and 2805). If the user selects a double-page spread of the text, the double-page spreads of the text are set as the application destinations of collective reflection regardless of whether the form of the covers is a spread or not (application destinations 2806 and 2807).

In either a case in which the user selects the double-page spread of the covers or a case in which the user selects the front cover and the back cover forming no spread, an operation on the collective reflection button is inactivated, and no collective reflection is performed. This case corresponds to a case in which it is determined in step S1501 of FIG. 15 that the covers are currently selected, and the button operation is inactivated.

A table 2811 indicates a table when right-side binding is selected and sheets of the same type are used for the covers and text. When the user selects a right page of the text, if the form of the covers is a spread, the right pages of the text are set as the application destinations of collective reflection (application destination 2812). When the user selects a right page of the text, if the form of the covers is not a spread, the right pages of the text and the back cover are set as the application destinations of collective reflection (application destination 2813). When the user selects a left page of the text, if the form of the covers is a spread, the left pages of the text are set as the application destinations of collective reflection (application destination 2814). When the user selects a left page of the text, if the form of the covers is not a spread, the left pages of the text and the front cover are set as the application destinations of collective reflection (application destination 2815). When the user selects a double-page spread of the text, if the form of the covers is a spread, the double-page spreads of the text and the double-page spread of the covers are set as the application destinations of collective reflection (application destination 2816). If the user selects a double-page spread of the text and if the form of the covers is not a spread, the double-page spreads of the text are set as the application destinations of collective reflection (application destination 2817).

When the user selects the double-page spread of the covers, if the form of the covers is a double-page spread, the double-page spreads of the text and the double-page spread of the covers are set as the application destinations of collective reflection (application destination 2818). If the form of the covers is not a spread and the user selects the front cover, the left pages of the text and the front cover are set as the application destinations of collective reflection (application destination 2819). If the form of the covers is not a spread and the user selects the back cover, the right pages of the text and the back cover are set as the application destinations of collective reflection (application destination 2820).

A table 2821 indicates a table when left-side binding is selected and sheets of the same type are used for the covers and text. Left-side binding is opposite to right-side binding in terms of whether each of the front cover and the back cover of the double-page spread of the covers is a left or right page. That is, when the user selects a right page of the text, if the form the covers is not a spread, the right pages of the text and the front cover are set as the application destinations of collective reflection (application destination 2822). When the user selects a left page of the text, if the form the covers is not a spread, the left pages of the text and the back cover are set as the application destinations of collective reflection (application destination 2823).

If the form of the covers is not a spread and the user selects the front cover, the right pages of the text and the front cover are set as the application destinations of collective reflection (application destination 2824). If the form of the covers is not a spread and the user selects the back cover, the left pages of the text and the back cover are set as the application destinations of collective reflection (application destination 2825).

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129464, filed Jul. 6, 2018, which is hereby incorporated by reference herein in its entirety.

What is claimed is:

1. An information processing apparatus comprising:
a generation unit configured to generate data formed from a plurality of pages based on original data;
a selection unit configured to select, from the plurality of pages in the generated data, a page whose setting information is to be acquired;
a display control unit configured to display an instruction item for reflecting the setting information of the page selected by the selection unit on another page with the same attribute as an attribute of the selected page; and
a reflection unit configured to reflect, if the instruction item is selected, the setting information of the selected page on the other page with the same attribute as the attribute of the selected page,
wherein display contents corresponding to the instruction item are decided based on the attribute of the selected page,
wherein the generation unit, the selection unit, the display control unit, and the reflection unit are implemented by at least one processor of the information processing apparatus.

2. The apparatus according to claim 1, wherein if the page selected by the selection unit is changed from a page of a first attribute to a page of a second attribute, the display contents corresponding to the instruction item are changed.

3. The apparatus according to claim 1, further comprising an acceptance unit configured to accept a page operation after the reflection by the reflection unit,
wherein the acceptance unit is implemented by the at least one processor of the information processing apparatus.

4. The apparatus according to claim 3, wherein if, as a result of the page operation accepted by the acceptance unit, page data laid out on a page without the same attribute as the attribute of the selected page is laid out on a page with the same attribute as the attribute of the selected page, the page data is displayed based on the setting information of the selected page.

5. The apparatus according to claim 3, wherein the page operation includes at least one of page addition, page insertion, and page deletion.

6. The apparatus according to claim 1, wherein if the plurality of pages include a front cover and a back cover, and a sheet type used for the front cover and the back cover is different from a sheet type used for the remaining pages of the plurality of pages, the reflection unit does not set the front cover and the back cover as targets of the reflection.

7. The apparatus according to claim 6, wherein if the sheet type used for the front cover and the back cover is the same as the sheet type used for the remaining pages of the plurality of pages, the reflection unit sets the front cover and the back cover as targets of the reflection.

8. The apparatus according to claim 1, wherein the attribute indicates at least one of a right page in a spread of a book, a left page in a spread of the book, and a spread of the book.

9. The apparatus according to claim 1, further comprising a control unit configured to cause a printing apparatus to perform print processing based on the generated data,
wherein the control unit is implemented by the at least one processor of the information processing apparatus.

10. A system comprising:
an information processing apparatus; and
a printing apparatus,
wherein the information processing apparatus comprises
(1) a generation unit configured to generate data formed from a plurality of pages based on original data,
(2) a selection unit configured to select, from the plurality of pages in the generated data, a page whose setting information is to be acquired,
(3) a display control unit configured to display an instruction item for reflecting the setting information of the page selected by the selection unit on another page with the same attribute as an attribute of the selected page, and
(4) a reflection unit configured to reflect, if the instruction item is selected, the setting information of the selected page on the other page with the same attribute as the attribute of the selected page,
wherein the generation unit, the selection unit, the display control unit, and the reflection unit are implemented by at least one processor of the information processing apparatus, wherein display contents corresponding to the instruction item are decided based on the attribute of the selected page, and wherein the printing apparatus executes print processing based on the generated data.

11. A control method executed in an information processing apparatus, the method comprising:

generating data formed from a plurality of pages based on original data;

selecting, from the plurality of pages in the generated data, a page whose setting information is to be acquired;

displaying an instruction item for reflecting the setting information of the selected page on another page with the same attribute as an attribute of the selected page; and reflecting, if the instruction item is selected, the setting information of the selected page on the other page with the same attribute as the attribute of the selected page, wherein display contents corresponding to the instruction item are decided based on the attribute of the selected page.

12. The method according to claim 11, wherein if the selected page is changed from a page of a first attribute to a page of a second attribute, the display contents corresponding to the instruction item are changed.

13. The method according to claim 11, wherein if page data laid out on a page without the same attribute as the attribute of the selected page is laid out on a page with the same attribute as the attribute of the selected page, the page data is displayed based on the setting information of the selected page.

14. The method according to claim 11, wherein if the plurality of pages include a front cover and a back cover, and a sheet type used for the front cover and the back cover is different from a sheet type used for the remaining pages of the plurality of pages, the front cover and the back cover are not set as targets of the reflection.

15. The method according to claim 14, wherein if the sheet type used for the front cover and the back cover is the same as the sheet type used for the remaining pages of the plurality of pages, the front cover and the back cover are set as targets of the reflection.

16. The method according to claim 11, wherein the attribute indicates at least one of a right page in a spread of a book, a left page in a spread of the book, and a spread of the book.

17. The method according to claim 11, further comprising causing a printing apparatus to perform print processing based on the generated data.

18. A non-transitory computer-readable storage medium storing a program for causing a computer to:

generate data formed from a plurality of pages based on original data;

select, from the plurality of pages in the generated data, a page whose setting information is to be acquired;

display an instruction item for reflecting the setting information of the selected page on another page with the same attribute as an attribute of the selected page; and reflect, if the instruction item is selected, the setting information of the selected page on the other page with the same attribute as the attribute of the selected page, wherein display contents corresponding to the instruction item are decided based on the attribute of the selected page.

* * * * *